United States Patent
Taylor, III et al.

(10) Patent No.: US 8,874,476 B1
(45) Date of Patent: Oct. 28, 2014

(54) AUTOMATED FEDERAL COURT FILING SYSTEM

(75) Inventors: W. C. Taylor, III, North Dover, NJ (US); Michael S. Ackerman, Morris Plains, NJ (US)

(73) Assignee: 4 S Technologies, LLC, Mountainside, NJ (US)

( * ) Notice: Subject to any disclaimer, the term of this patent is extended or adjusted under 35 U.S.C. 154(b) by 937 days.

(21) Appl. No.: 12/533,974

(22) Filed: Jul. 31, 2009

Related U.S. Application Data

(60) Provisional application No. 61/137,621, filed on Jul. 31, 2008.

(51) Int. Cl.
G06Q 50/00 (2012.01)
G06Q 40/00 (2012.01)

(52) U.S. Cl.
USPC ............ 705/35; 705/7.12; 705/7.27; 705/311

(58) Field of Classification Search
CPC ....... G06Q 40/04; G06Q 40/02; G06Q 40/06; G06Q 40/00; G06Q 10/087; G06Q 50/18
See application file for complete search history.

(56) References Cited

U.S. PATENT DOCUMENTS

| | | |
|---|---|---|
| 6,694,315 B1 | 2/2004 | Grow |
| 6,772,149 B1 | 8/2004 | Morelock et al. |
| 2002/0161733 A1* | 10/2002 | Grainger ................. 706/45 |
| 2002/0172335 A1 | 11/2002 | Narasimhan et al. |
| 2003/0033167 A1 | 2/2003 | Arroyo et al. |
| 2003/0233316 A1* | 12/2003 | Hu et al. .................. 705/38 |
| 2004/0019496 A1 | 1/2004 | Angle et al. |
| 2004/0064404 A1 | 4/2004 | Cohen et al. |
| 2004/0098284 A1 | 5/2004 | Petito et al. |
| 2005/0021540 A1 | 1/2005 | McKee et al. |
| 2005/0187807 A1 | 8/2005 | Delatte et al. |
| 2005/0216555 A1 | 9/2005 | English et al. |
| 2008/0030774 A1* | 2/2008 | Webster et al. ............ 358/1.15 |

* cited by examiner

*Primary Examiner* — Sangwoo Ahn
(74) *Attorney, Agent, or Firm* — Mayer & Williams PC; Mark K. Young

(57) ABSTRACT

A filing system is configured for automating filings through an electronic submission portal (such as a CM/ECF web portal) by acquiring relevant data from one or more sources (such as a user's system database) and then initiating and completing submission portal-compatible filings using the acquired data through the application of a variety of logic, document templates, rules, text, variables, macros, and/or search strings.

40 Claims, 25 Drawing Sheets

*FIG. 10*
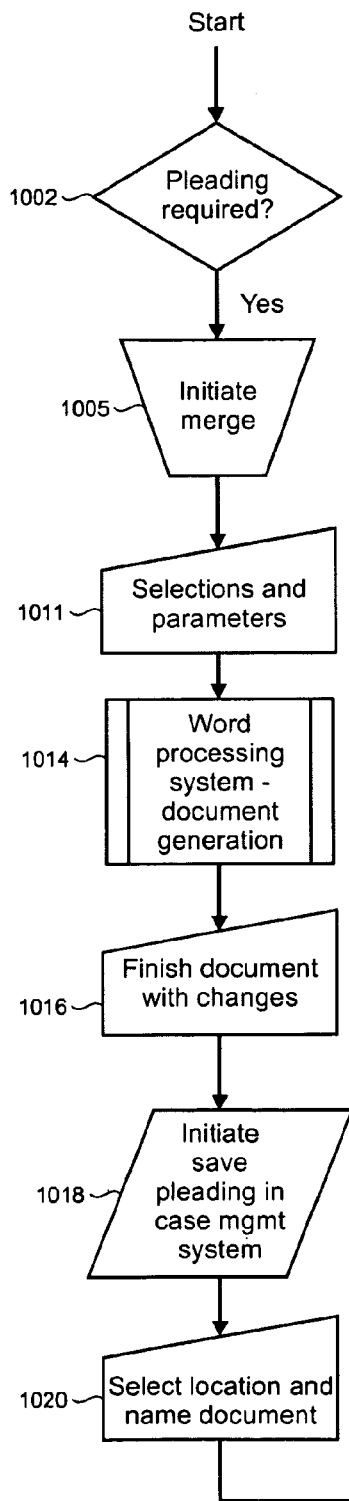
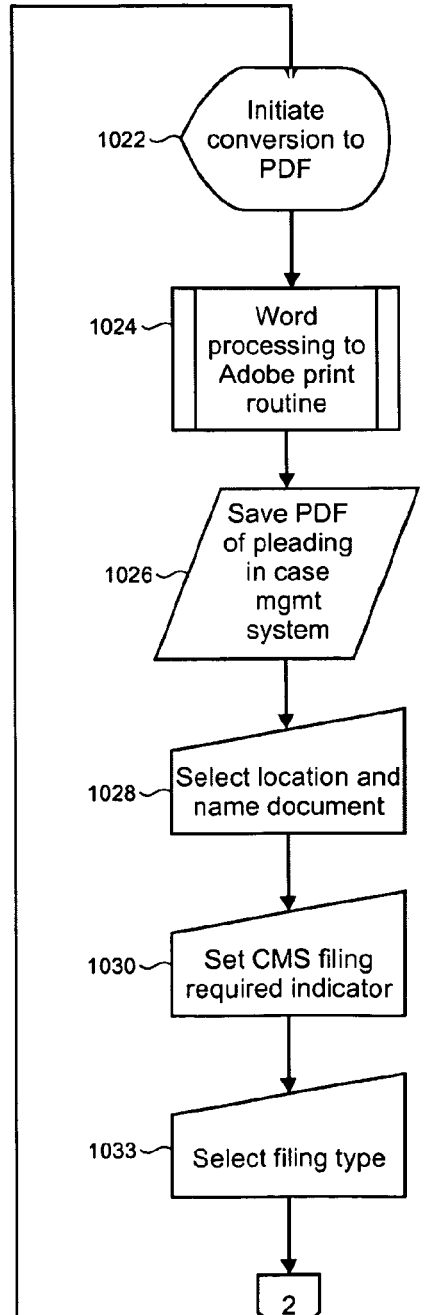

*FIG. 14*

Automated Federal Court Filing System (1405)

- Filing Required ☐
- File #
- Prior Event
- Filing Type
- Date if not today
- Not Default Documents ☐
- Attorney if not default
- Primary Document
- Attachment 1
- Attachment 2
- Attachment 3
- Attachment 4
- Attachment 5
- Attachment 6
- Attachment 7

[ SAVE ] [ CANCEL ] [ REFRESH ]

*FIG. 15*

Automated Federal Court Filing System (1405)

- Filing Required ☑ (1505)
- File #: 12345-2 (1513)
- Prior Event
- Filing Type: MFR (1516)
- Date if not today
- Not Default Documents ☐
- Attorney if not default
- Primary Document
- Attachment 1
- Attachment 2
- Attachment 3
- Attachment 4
- Attachment 5
- Attachment 6
- Attachment 7

[ SAVE ] [ CANCEL ] [ REFRESH ]

FIG. 16

Automated Federal Court Filing System (1405, 1600)

- 1505: Filing Required ☑
- 1513: File # `12345-2`
- Prior Event
- 1516: Filing Type ▼
- Date if not today Not Default Documents ☐ Attorney if no[t default]

Primary Document | Attachment 1 | Attachment 4 | Attachment 5

Dropdown (1608):
- Amended Objection to Conf
- Motion for Relief from Stay
- Motion to Dismiss
- Notice of Appearance
- NOA & OBJ
- Notice of Default
- Objection to Confirmation
- Proof of Claim
- Amended POC
- Opposition
- Prospective Relief
- Supplemental Cert
- Filing Loan Documents

SAVE

FIG. 17

Automated Federal Court Filing System (1405, 1700)

- 1505: Filing Required ☑
- 1513: File # `12345-2`
- Prior Event `27` (1706)
- 1516: Filing Type `NOD`
- Date if not today Not Default Documents ☐ Attorney if not default Primary Document | Attachment 1 | Attachment 2 | Attachment 3
Attachment 4 | Attachment 5 | Attachment 6 | Attachment 7

SAVE | CANCEL | REFRESH

AUTOMATED FEDERAL COURT FILING SYSTEM

STATEMENT OF RELATED APPLICATION

This application claims the benefit of U.S. Provisional Patent Application Ser. No. 61/137,621, filed Jul. 31, 2008, entitled "Automated Federal Court Filing System", the disclosure of which is incorporated by reference with the same effect as if set forth at length herein.

BACKGROUND

The United States Federal Court offers attorneys, creditors, trustees and other non-individual parties filing actions in connection with Federal Court cases a mechanism to electronically enter their pleadings and other notices (herein referred to as "filings") to a case docket. This mechanism is called the CM/ECF (Case Management/Electronic Case Filing) system which offers an electronic web-based portal that is available to authorized parties in each Appellate Court, Federal Court, and Bankruptcy Court district. CM/ECF enables authorized parties to make filings via the Internet by uploading the pleading or other filing, with supporting attachments when appropriate, in Adobe® PDF (Portable Document Format), and by paying for the filing using a credit card (or, in some districts, through electronic check).

Many users of the CM/ECF system use proprietary or generally available office automation systems that have been suitably customized to prepare Federal Court filings. In some cases, the completed pleading to be filed is produced in hard copy and then scanned and converted to PDF, along with supporting attachments, in order to make the filing compatible with the CM/ECF web portal filing submission process and requirements. In other cases, the particular office automation program that is utilized has integrated PDF formatting functionalities which allow the pleading/filing to be saved in PDF format directly from the filer's system in which it is created.

While the CM/ECF system supports substantial utility for its users, it is not configured to enable any widespread system-to-system automation for the submission of filings as the web portal is arranged to only facilitate the separate and individual entry of each filing. The CM/ECF system can be supplemented by an available fixed-record-length batch system for claim-related submissions (e.g., Proof of Claim, Transfers of Claim, etc.) but such claims-related activities do not make up the bulk of CM/ECF filings. Overall, utilization of the currently available electronic facilities can typically be expected to consume a significant amount of resources at law firms, creditors, and other parties who need to handle a large volume of filings.

SUMMARY

A filing system is configured for automating filings through an electronic submission portal (such as a CM/ECF web portal) by acquiring relevant data from one or more sources (such as a user's system database) and then initiating and completing submission portal-compatible filings using the acquired data through the application of a variety of logic, document templates, rules, text, variables, macros, and/or search strings. The system may poll relevant dockets and then add to a given filing the appropriate cross references to associated filings and/or prior docketed events and/or other registered events and/or data. The system can be configured to store the appropriate user IDs (identifications) and passwords so that interfaces can be established with different electronic submission portals that are associated with various different entities (such as the different Federal Courts). Message and error handling throughout the filing process is automated as is the capture of a filing receipt. Confirmation of a successful filing (or error messages relating to the reasons for an unsuccessful filing), system messages/alerts, and activity data/usage statistics can also be automatically delivered to a user and/or a user's system or system administrator.

In various illustrative examples, the filing system is arranged as an automated Federal Court filing system which is implemented as an application using a variety of software components that run on a personal computer ("PC"), server or a combination of PC and server. The software components provide respective functionalities including i) a user interface ("UI"); ii) automated acquisition and storage of case-related data required to create Federal Court filings and to make the submissions to the CM/ECF system; iii) automated creation of CM/ECF-ready, Federal Court-acceptable filings; iv) automated completion of CM/ECF filings; v) storage of CM/ECF system user IDs and passwords for different court web portals; vi) implementation of an automated interface with various CM/ECF court/district web portals on a client-specific, filing type-specific, court-specific, judge's rule-specific, or district-specific basis; vii) automated polling and determination of required prior docket events and/or other registered events and/or data to be associated with filings; viii) automated error and message handling during the CM/ECF filing process that enables errors to be monitored as they occur during the CM/ECF filing submission process and workflow routines performed by the application to be modified (and rerun when necessary) in response to the errors; ix) automated confirmation of and capture of the CM/ECF receipt for the completed filing; and, x) automated delivery of the completed filing (with or without the CM/ECF receipt) or incomplete filing notification to the initiating party, and automated delivery of error messages or other process-related messages.

Advantageously, the present automated Federal Court filing system interacts with a CM/ECF web portal in a substantially similar manner as would a human operator and provides time and cost savings while decreasing the occurrence of errors in the filings.

DESCRIPTION OF THE DRAWINGS

FIGS. 10 and 10A show a flowchart of a generic attorney-initiated filing to a Federal Bankruptcy Court as may be facilitated using the automated Federal Court filing system;

FIGS. 14-20 show various screens provided by a user interface to the automated Federal Court filing system application.

Like reference numerals indicate like elements in the drawings.

DETAILED DESCRIPTION

Parties needing to submit filings with a Federal Court may organize their resources in various ways when interacting with the CM/ECF system. For example, a law firm handling many cases being heard in Federal Court may have sufficient CM/ECF filing volume to warrant a dedicated individual or staff person who does the preparation for CM/ECF web portal submission as well as performing the actual submission for filing through the CM/ECF web portal. Alternatively, some firms expend valuable technically trained human resources—for example, a paralegal, legal secretary or attorney—to prepare the filings and/or to perform the CM/ECF filing submission process at the portal.

Creditors, similar to law firms, often have large volumes of debtors seeking bankruptcy protection. This often necessitates the need to make filings to Federal Bankruptcy Court to assert the creditor's claims, respond to debtors' plans and make other filings or notices which are required in order to protect the creditor's asset, the debt and/or the creditor's security interest in the underlying collateral.

A creditor's volume of bankruptcy-affected assets is likely to be high, in the thousands of cases. Retention of legal representation to make perfunctory filings to protect a debt is often too costly because recovery of the fees and costs may be unlikely. For example, the asset may become a charge-off and/or a repossession, replevin or foreclosure because the value of the collateral securing the debt is not sufficient (if the debt is enforced and the collateral is acquired) for the creditor to recover all or even part of its investment.

Accordingly, both law firms and creditors (as well as other parties) can be expected to benefit from the present solution that enables automation of the creation of Federal Court filings in general, and the creation of Federal Bankruptcy Court filings in particular. While the following description highlights a filing submission to the Federal Courts as an illustrative example, it is emphasized that the present filing system has applicability to filings that may be made to any of a variety of electronic submission portals including those associated, for example, with non-Federal courts, governmental agencies, non-governmental agencies, financial institutions, investors, or data intermediaries (i.e., entities which handle submissions on behalf of clients. Lender Processing Services, Inc. (known as "LPS") is one example of a data intermediary).

Figure 1:
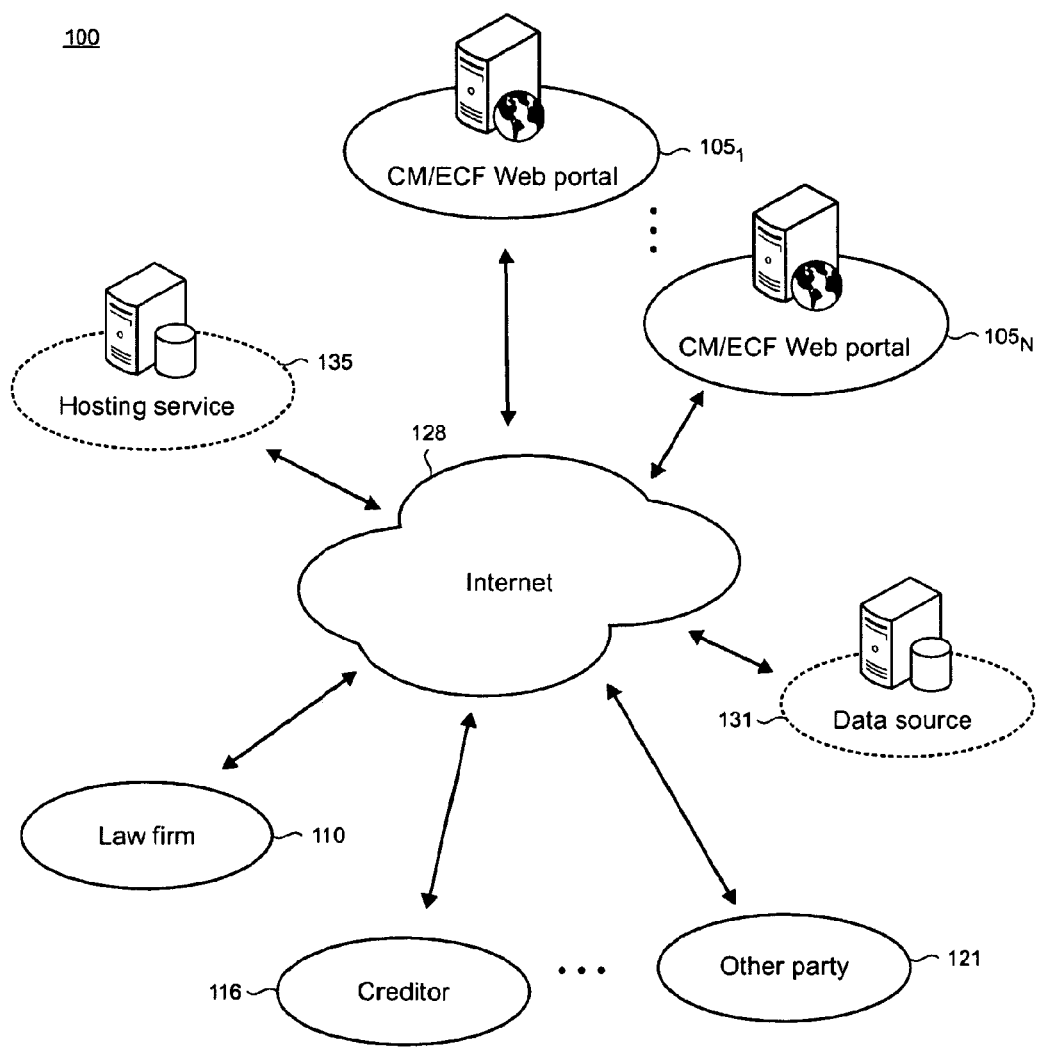
FIG. 1 shows an illustrative environment in which the present automated Federal Court filing system operates.

Turning now to the drawings, FIG. 1 shows an illustrative environment 100 in which the present automated Federal Court filing system may operate. A number of CM/ECF web portals $105_{1\ldots N}$ are supported in the environment 100 that typically facilitate the submission of electronic filings to various Federal Courts by different groups of users such as a law firm 110, creditor 116, and other parties 121 (that are registered to perform filings (e.g., law firm clients, trustees, etc.) that may have a need to submit such filings. It is emphasized that the groups shown in FIG. 1 are intended to be illustrative and that any of a variety of different user types and groups may be supported in the environment 100 as may be required to meet the needs of a given implementation. The groups of users 110, 116, and 121 can typically access the CM/ECF web portals 105 using a connection to a network such as the Internet 128.

The environment 100 also supports a data source 131 and a hosting service 135, both of which may be optionally utilized in some scenarios (as indicated by the dashed lines). The data source 131 can be utilized to store case management data, loan servicing data, and/or other data for the user groups and be accessed, for example, as part of a service hosted by a third party. Similarly, the hosting service 135 can be configured to support the present automated Federal Court filing system application (in whole or in part) as a hosted service. As shown in FIG. 1, the data source 131 and hosting service 135 may be accessed via the Internet 128. Alternatively, other types of network connections may also be utilized such as private networks or virtual private networks ("VPNs").

Figure 2:
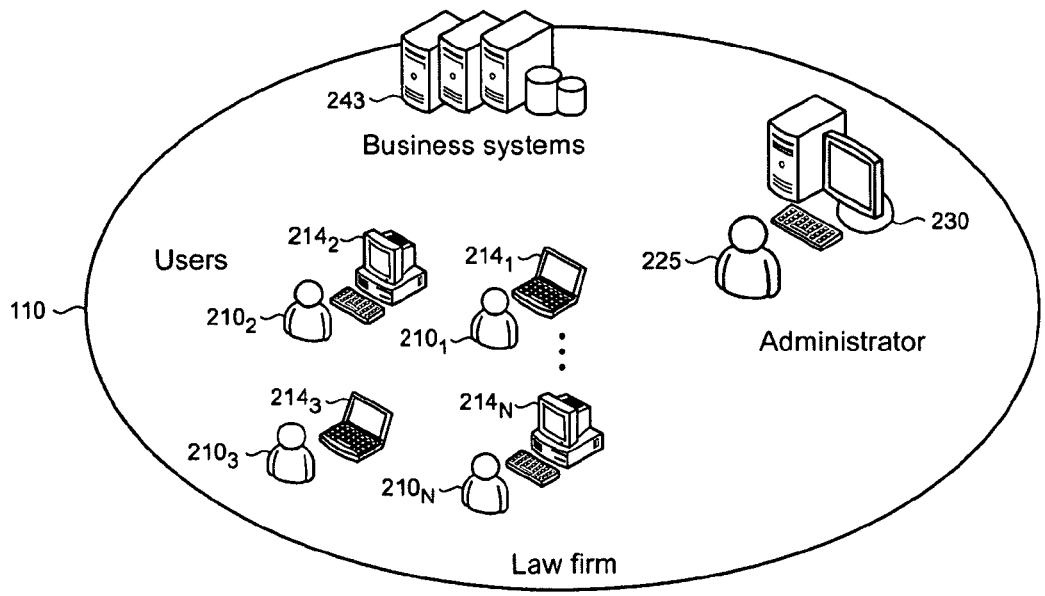
FIG. 2 shows details pertaining to an illustrative group of users of the automated Federal Court filing system.

FIG. 2 shows details of infrastructure that supports an illustrative user group. While the law firm 110 is shown, other groups such as creditors and other parties can typically be expected to use infrastructure that is arranged in a similar manner. Accordingly, while the law firm 110 is shown and described in the various illustrative examples that follow, the concepts and teachings embodied therein may be construed as having equal applicability to the other user group types as well. As shown in FIG. 2, the law firm 110 supports a group of users $210_{1,2\ldots N}$ who work on various types of computing platforms $214_{1,2\ldots N}$ such as workstations, PCs (personal computers), and laptops. An IT (information technology) administrator 225 is also included in the law firm 110 who works at an administrator console 230.

The law firm 110 supports various business systems 243. These systems can vary by implementation, but will typically include general automation and productivity tools and applications, communication and network resources, databases, and the like. The business systems 243 will also typically utilize computing platforms such as servers and various types of network hardware such as firewalls and gateways. In some usage scenarios, the law firm 110 may implement case and docket management systems and loan databases for example, as part of its internally supported business systems 243. In other scenarios, the law firm 110 may also rely on third-party resources and/or services such as the data source 131 and hosting service 135 as shown in FIG. 1 and described in the accompanying text.

Figure 3:
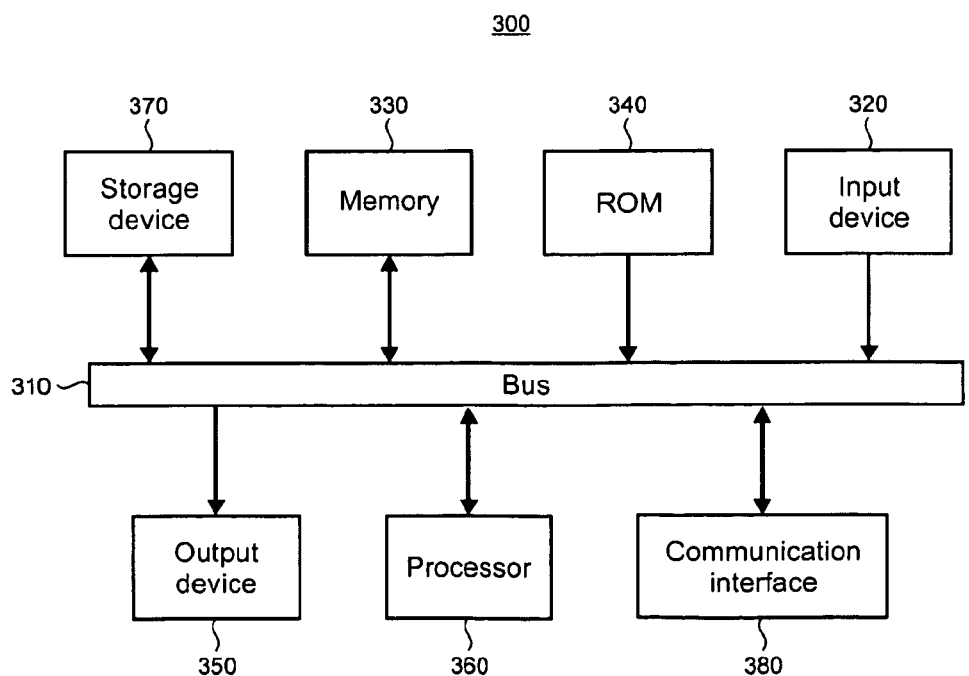
FIG. 3 is a simplified functional block diagram of an illustrative computing platform that may be used to support the present automated Federal Court filing system.

FIG. 3 is a simplified functional block diagram 300 of an illustrative computing platform that may be utilized in the law firm 110. The block diagram 300 is generally applicable to both the computing platforms 214 (FIG. 2) as well as the various servers that may be utilized in the business systems 243 or the hosting service 135 (FIG. 1).

The computing platform is configured with a variety of components including a bus 310, an input device 320, a memory 330, a read only memory ("ROM") 340, an output device 350, a processor 360, a storage device 370, and a communication interface 380. Bus 310 will typically permit communication among the components of the computing platform.

Processor 360 may include at least one conventional processor or microprocessor that interprets and executes instructions. Memory 330 may be a random access memory ("RAM") or another type of dynamic storage device that stores information and instructions for execution by processor 360. Memory 330 may also store temporary variables or other intermediate information used during execution of instructions by processor 360. ROM 340 may include a conventional ROM device or another type of static storage device that stores static information and instructions for processor 360. Storage device 370 may include compact disc ("CD"), digital versatile disc ("DVD"), a magnetic medium, or other type of computer-readable storage device for storing data and/or instructions for processor 360.

Input device 320 may include a keyboard, a pointing device or other input device. Output device 350 may include one or more conventional mechanisms that output information, including one or more display monitors, or other output devices. Communication interface 380 may include a transceiver for communicating via one or more networks via a wired, wireless, fiber optic, or other connection.

The computing platform may perform such functions in response to processor 360 executing sequences of instructions contained in a tangible computer-readable medium, such as, for example, memory 330, ROM 340, storage device 370, or other medium. Such instructions may be read into memory 330 from another machine-readable medium or from a separate device via communication interface 380.

Figure 4:
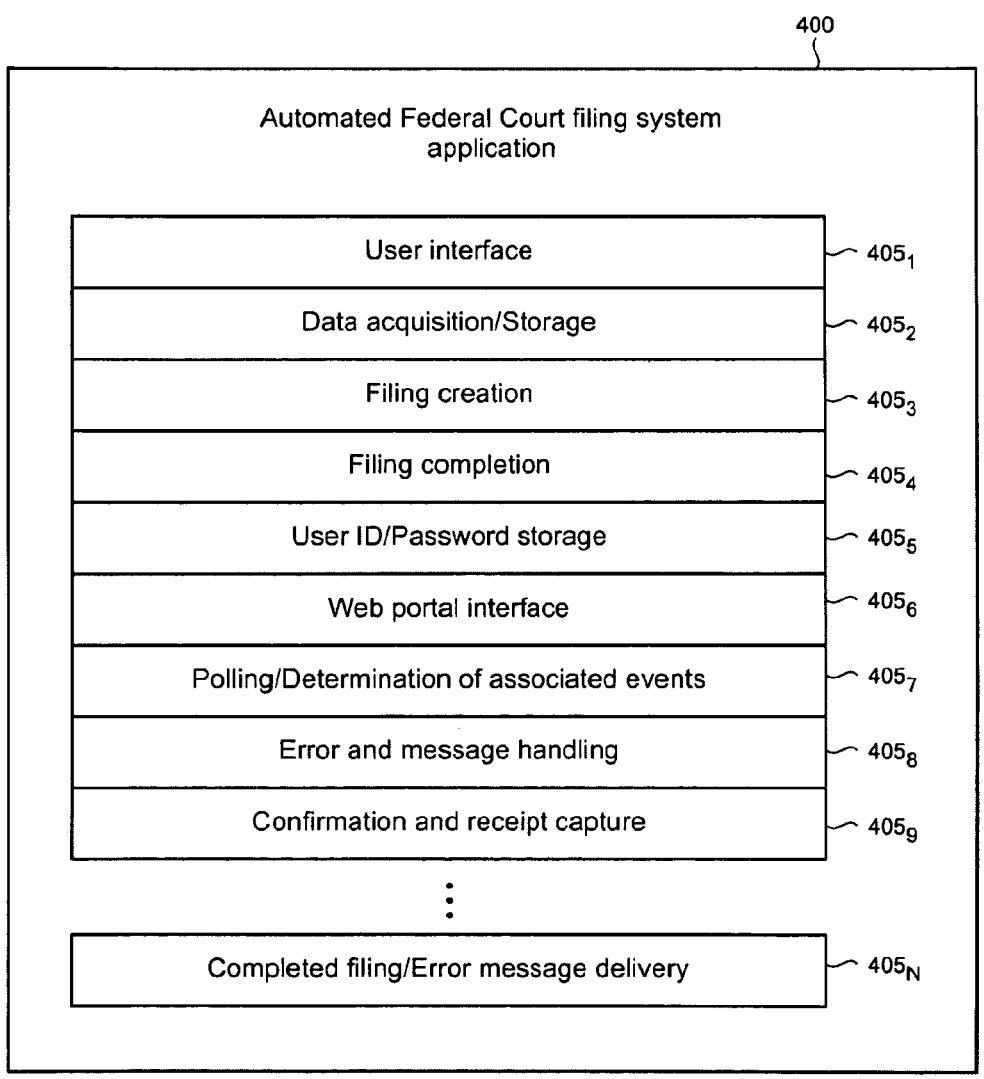
FIG. 4 shows a group of software components that are illustratively implemented in an automated Federal Court filing system application.

FIG. 4 shows a group of components $405_{1,2...N}$ that illustratively comprises an automated Federal Court filing system application 400. The components 405 will typically be implemented using software code that executes on one or more computing platforms in most typical implementations. However, in alternative implementations, the executable code can be embodied in hardware and/or firmware, or a mix of software, and/or hardware, and/or firmware. The allocation of functionality among the components 405 may also be made in a different way from what is shown in FIG. 4 and described below as may be needed for a particular implementation. In addition, not all of the components 405 may be needed in every implementation.

The components 405 provide respective functionalities including i) a UI $405_1$; ii) automated acquisition and storage of case-related data required to create Federal Court filings and to make the submissions to the CM/ECF system $405_2$; iii) automated creation of CM/ECF-ready Federal Court-acceptable filings $405_3$; iv) automated completion of CM/ECF filings $405_4$; v) storage of CM/ECF system user IDs and passwords for different court web portals $405_5$; vi) implementation of an automated interface with various CM/ECF court/district web portals $405_6$; vii) automated polling and determination of required prior docket events to be associated with filings $405_7$; viii) automated error and message handling during the CM/ECF filing process $405_8$; ix) automated confirmation of and capture of the CM/ECF receipt for the completed filing $405_9$; and, x) automated delivery of the completed filing (with or without the CM/ECF receipt) or incomplete filing notification to the initiating party or user, and automated delivery of error messages or other process-related messages $405_N$. Each of the foregoing components is described in more detail below.

Figure 5:
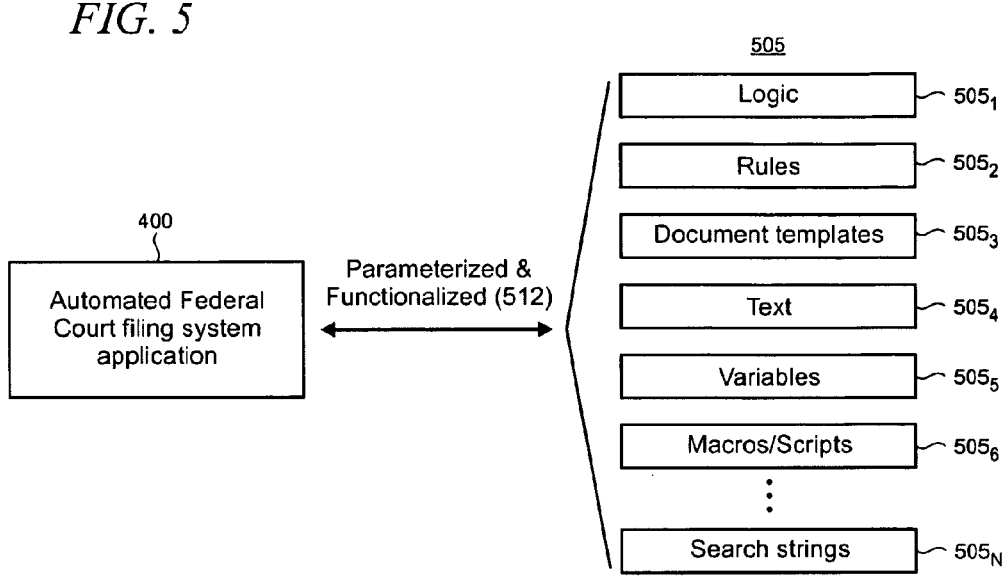
FIG. 5 shows illustrative resources that are typically applied by the automated Federal Court filing system application.

As shown in FIG. 5, the automated Federal Court filing system application 400 will typically apply one or more resources 505 in order to provide the automated filing functionality as described herein. In this example, the resources 505 include logic $505_1$, rules $505_2$, document templates $505_3$, text $505_4$, variables $505_5$, macros and/or scripts $505_6$, and search strings $505_N$. Some of resources 505 can be functionalized and parameterized as needed (for example by implementing them as separate external resources to the application code) to facilitate the automated processing by the application 400 as indicated by reference numeral 512 in FIG. 5. It is noted that the resources 505 can be expected to vary in order to be responsive to particular usage scenarios. For example, resources can be specifically developed and tailored to particular portions of the Federal Court system and thus be district-specific, division-specific, and/or judge-specific. In such cases, all of the Federal Court CM/ECF web portals will typically need to be catalogued. It is noted that these particular resources 505 are intended to be illustrative and that other resources may also be utilized as needed to meet the needs of the particular implementation.

Figure 6:
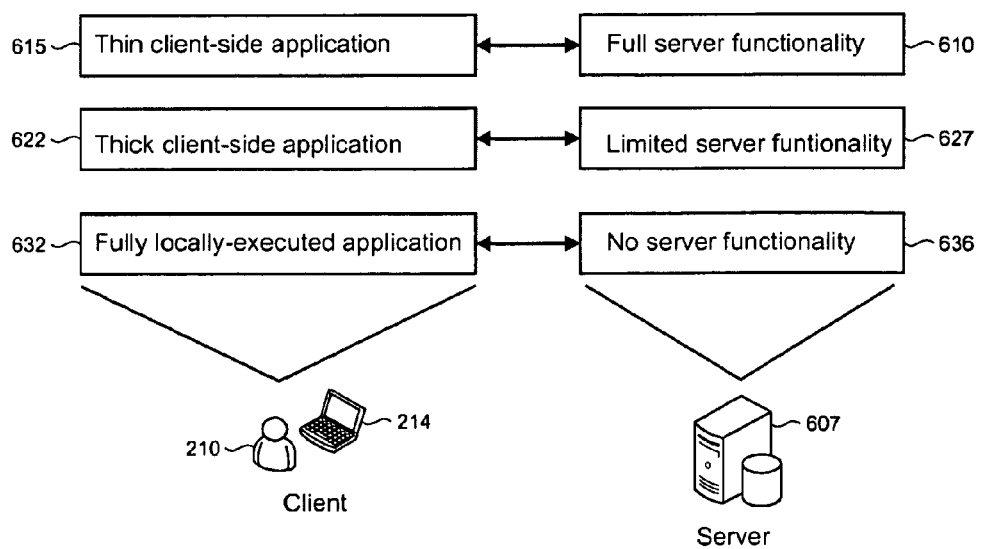
FIG. 6 shows various alternative distributions of application functionality between client and server computing platforms.

As shown in FIG. 6, the automated Federal Court filing system application 400 can be arranged in a variety of alternative configurations each of which allocate the functionality between a client computing platform 214 and a server 607 differently as needed to meet the requirements of a given implementation. The server 607 in this example may be implemented as an internal resource in the law firm 110 (e.g., as an element of the business system 243), or as a remote server supported by a third party such as the hosting service 135 (FIG. 1).

In some implementations, the Federal Court filing system application 400 can be executed substantially on the server (i.e., full server functionality as indicated by reference numeral 610) so that only a relatively thin client application (such as a web browser or other UI functionality) is needed on the client computing platform 214 (615). Alternatively, the functionality split can be effectively reversed where a relatively more capable thick client-side application is implemented (622) and the server supports more limited functionality (627). And in some cases it may be desirable to configure the application 400 so that it fully executes on the client computing platform 214 (632) where no server functionality needs to be utilized (636). However, it is emphasized that the particular allocations shown in FIG. 6 are intended to be illustrative and that other allocations of application code execution between client 214 and server 607 may be utilized as needed to meet the requirements of a particular implementation.

Returning to FIG. 4, the UI component $405_1$ is configured to support interactivity between a user 210 (FIG. 2) and the automated Federal Court filing system application 400. Typically, the UI is deployed as a graphical user interface and will utilize a variety of conventional UI objects in order to support a desired level of interactivity including, for example, controls (e.g., buttons and the like), menus, text entry fields, and other UI objects. Various screens supported by the UI $405_1$ are shown in FIGS. 14-20 and described in the accompanying text. The UI component $405_1$ is typically configured to enable capturing or changing filing parameters, returning error messages, enabling withdrawal of orders, and initiating execution of the automated Federal Court filing system application 400.

The data acquisition/storage component $405_2$ enables the automated acquisition of the data from one or more data sources as needed for the creation of the filings, in court-approved formats, which may be required during Federal Court proceedings. The data sources may be configured as internal resources to the law firm 110, or be accessed as an external resource such as the data source 131 (FIG. 1).

Once a trigger is initiated—generally by a selection using the UI of the automated Federal Court filing system application 400 (or, alternately, a system-to-system message from the user's system (e.g., business system 243) to the application 400 which is equivalent to the trigger—within which the type of filing is identified, the Federal Court filing system application 400 then executes processes and/or routines as appropriate to i) access one or more system databases associated with a user 210, ii) extract the particular data components which are required in order to develop a given filing, iii) execute error handling, and iv) execute confirming message routines in the user's system. Various ones of the resources 505 will typically be utilized to provide a basis for determining the required data elements for commonly utilized Federal Court filings (e.g., pleadings, notices, and the like).

As noted above, the automated Federal Court filing system application 400 can apply district-specific, division-specific, and judge-specific rules and other resources as appropriate. Accordingly, the data acquisition/storage component $405_2$ can be configured to satisfy requirements for a specific pleading in a specified Federal Court district and be responsive to local courts' and judges' rules.

The filing creation component $405_2$ uses the data acquired from one or more data systems of the user 210, in combination with generally available word processing and document formatting software and technologies, to create the CM/ECF admissible pleadings and other filings. The acquired data is merged into word processing templates with variable entries determined by macros pertaining to word processing and various rules. The resulting documents, in a word processing format, are stored within the automated Federal Court filing system application 400 processing tables. Subsequently, the filing creation component $405_3$ executes document reformatting routines to convert the completed word processing documents to the CM/ECF-prescribed format (typically Adobe PDF) and stores the PDFs in the processing tables.

The filing completion component $405_4$ uses the data acquired from the user's data system and the file-able pleadings and documents, to create the CM/ECF-compatible workflow routines for each filing. The data and documents are used in workflow streams which are executed by the automated Federal Court filing system application 400 for each discrete filing submission entry to a CM/ECF web portal 105 (FIG. 1). The application 400 executes responses to CM/ECF errors and messages, and adapts the submission workflow stream accordingly to ensure either a) the appropriate completed submission of the filing, or b) the appropriate discontinuation of the filing routine, with the appropriate abort and error messaging and handling to ensure that incorrect filings do not occur.

The user ID/password storage component $405_5$ enables court-specific user IDs and passwords to be maintained by the automated Federal Court filing system application 400. This functionality is particularly useful because each Federal Court district has its own user ID and corresponding password for each CM/ECF user where the users are generally either attorneys or creditor parties. The user ID/password storage component $405_5$ maintains relationship tables for each CM/ECF user's IDs and passwords by district.

The data is secured and maintainable based on security relationships. In addition, the data is client-segregated, and usable only in connection with rules-based processing which securely identifies the appropriate filer, based on either source system data or user input selection. Alternate user ID routines and CM/ECF login error and message handling is further embedded in the automated Federal Court filing system application and CM/ECF interface logic. Error messaging to the users 105 is also embedded in the application logic.

The web portal interface component $405_6$ incorporates logic to enable world-wide web navigation to the appropriate CM/ECF site for the court and district in which the filing is to be made based on rules and the data collected from the source system. The web portal interface component $405_6$ enables the automated Federal Court system application 400 to interact with the CM/ECF web portals in a substantially similar manner as would a human user by recognizing data presented on the web pages, making decisions based on the recognized data, making entry selections, navigating, making text entries and uploading documents where required. Accordingly, the resources 505 employed by the web portal interface component $405_6$ will typically include cataloged navigation paths to the various CM/ECF sites.

The polling/determination of associated events component $405_7$ enables the automated Federal Court filing system application 400 to mine docket data to locate case docket entries' text descriptions in order to locate the appropriate CM/ECF events to satisfy cross-reference requirements (where a CM/ECF event is essentially a label that is applied to a given filing that determines how it is routed and handled). This functionality makes use of the recognition that certain pleadings and other filings must be cross-referenced to a prior court case docket entry to which the filing refers during the filing process. Most commonly that reference will be a prior entry to the case docket for the same case for which a filing is being submitted, although in the case of adversary proceedings, a cross-reference to a separate adversary case file and/or event may be required.

The error and message handling component $405_8$ is configured to functionalize and parameterize responses to errors and/or error messages that are encountered during the course of a filing submission. Typically, such errors and error messages must be responded to in order to proceed with a given filing.

The confirmation receipt capture component $405_9$ applies various ones of the resources 505 in order to recognize certain text to make a determination that the receipt page (which is the last page presented during a CM/ECF filing submission process) has been presented on the web portal which indicates that the filing has been accepted electronically. The confirmation receipt capture component $405_9$ will capture the receipt page data, convert it to a PDF file, name the file according to a naming convention utilized by the user 210 (or the user's group referred to herein as the "client") as well as district and filing type and will store the PDF file containing the confirmation receipt for subsequent delivery to the user 210 or the user's system.

The completed filing/error message delivery component $405_N$ is configured to enable the automated Federal Court system application 400 to deliver messages and data to users and systems based on rules and/or data that is either collected or developed during the execution of the application code. Confirmations of successful filings will typically be delivered to the users 210 or systems by various delivery mechanisms including e-mail, FTP (file transfer protocol), web service, or other system-to-system functionality based on embedded rules in view of either the filing type level, the district level, or the client level. Relevant files and data can accompany the confirmations in some cases. Error messages concerning the reason for unsuccessful filings will also typically be delivered to users 210 or systems.

System alerts, comprising errors or other messages, may be delivered to system administrators (e.g., IT administrator 225 in FIG. 2), users 210, or user's systems via the component 405$_N$. Activity data (i.e., usage statistics and other data) can also be delivered.

Several specific usage scenarios will now be presented to highlight various features and functionalities of the present automated Federal Court filing system as compared with current practices that substantially rely on manual operations. However, the particular scenarios and CM/ECF events shown and described are intended to be illustrative and should not be construed as limitations on the scope of the present arrangement.

Figure 7:
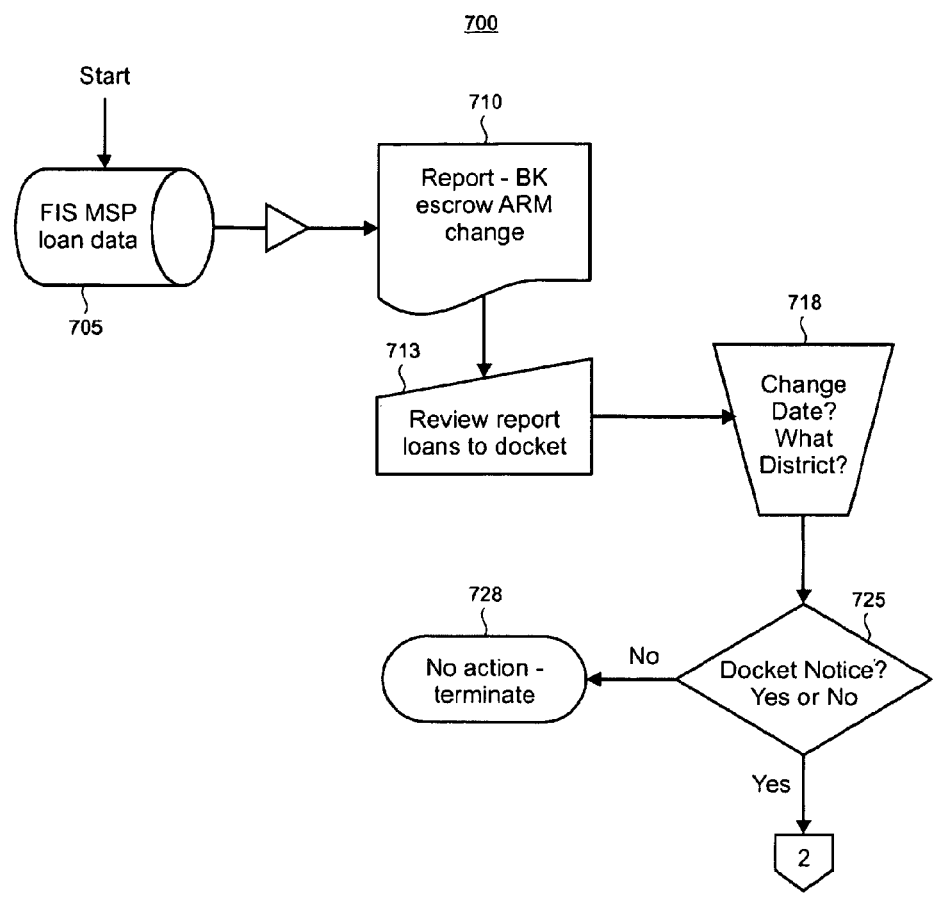
FIGS. 7, 7A, 7B, and 7C show a flowchart of a typical creditor-initiated filing as is currently practiced using a substantial number of manual operations.
Figure 7A:
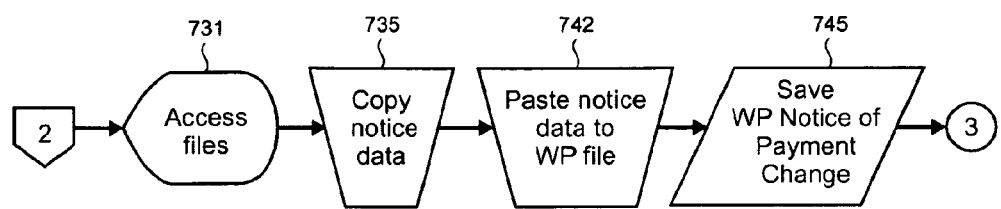
Figure 7B:
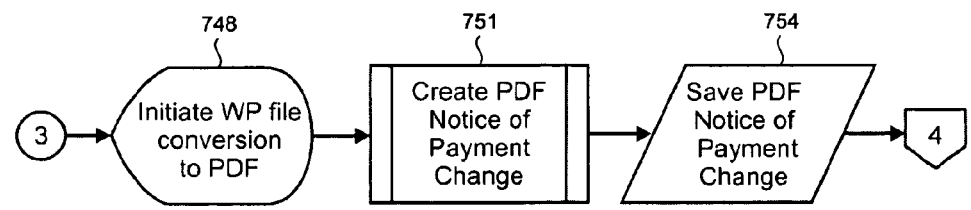

FIGS. 7, 7A, and 7B show a flowchart 700 which depicts a typical creditor-initiated filing as is currently practiced using a substantial number of manual processes. It is noted that the flowcharts shown herein use conventional flowchart symbols as identified in the key 701.

In this particular example a "Notice of Payment Change" to a Federal Bankruptcy Court is sought to be filed, and the loan data system being utilized is the MSP (Mortgage Servicing Package) provided by Fidelity National Information Systems, Inc. ("FIS") as a third party-supported data source 705 (i.e., the FIS MSP data 705 is supplied from an external source like data source 131 in FIG. 1). A report 710 indicates a change to a bankruptcy ("BK") escrow ARM (adjustable rate mortgage). A human resource, who is typically technically trained (for example a paralegal, legal secretary, or attorney), reviews the report 710 in order to identify the affected loans and determine the dates to be changed and in which Federal Court district, as respectively shown at blocks 713 and 718.

For each loan, a decision at block 725 is made as to whether a "Notice of Payment Change" needs to be docketed through the appropriate CM/ECF web portal. If no docketing is necessary the flowchart 700 terminates at block 728. Otherwise, control passes to block 731 in FIG. 7A where the relevant files are accessed from the data source. Notice data is copied and then pasted into a conventional word processing ("WP") file, as respectively indicated at block 735 and 742. The WP Notice of Payment Change is then saved at block 745.

The flowchart continues at FIG. 7B where at block 748 the conversion of the word processing file to PDF is initiated. The PDF Notice of Payment Change is created at block 751 and saved at block 754.

Figure 7C:
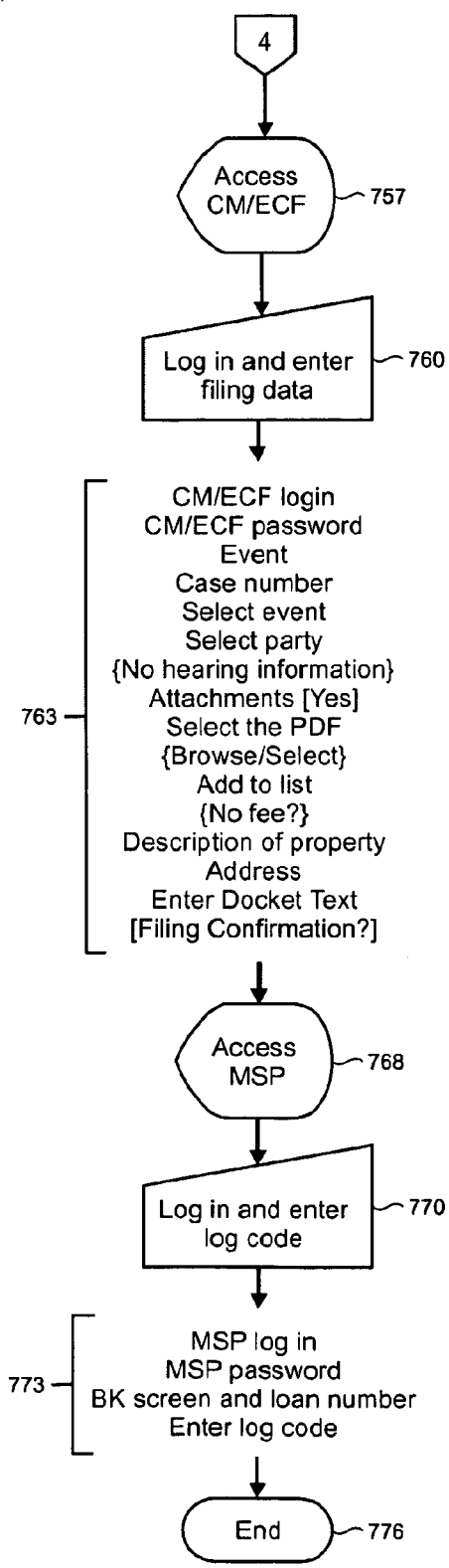

The human resource next accesses the appropriate CM/ECF web portal at block 757 in FIG. 7C and logs in to enter relevant filing data at block 760. Working through the CM/ECF web-based UI, the human resource will navigate to various web pages in order to interact with the CM/ECF site to perform tasks and enter data as needed to complete the "Notice of Payment Change" filing, as indicated by reference numeral 763.

The CM/ECF filing is then updated into the loan data system (which in this example is the MSP system as noted above) by accessing MSP, performing login to enter the relevant log code, etc., as indicated at blocks 768, 770, and 773. Flowchart 700 terminates at block 776.

Figure 8:
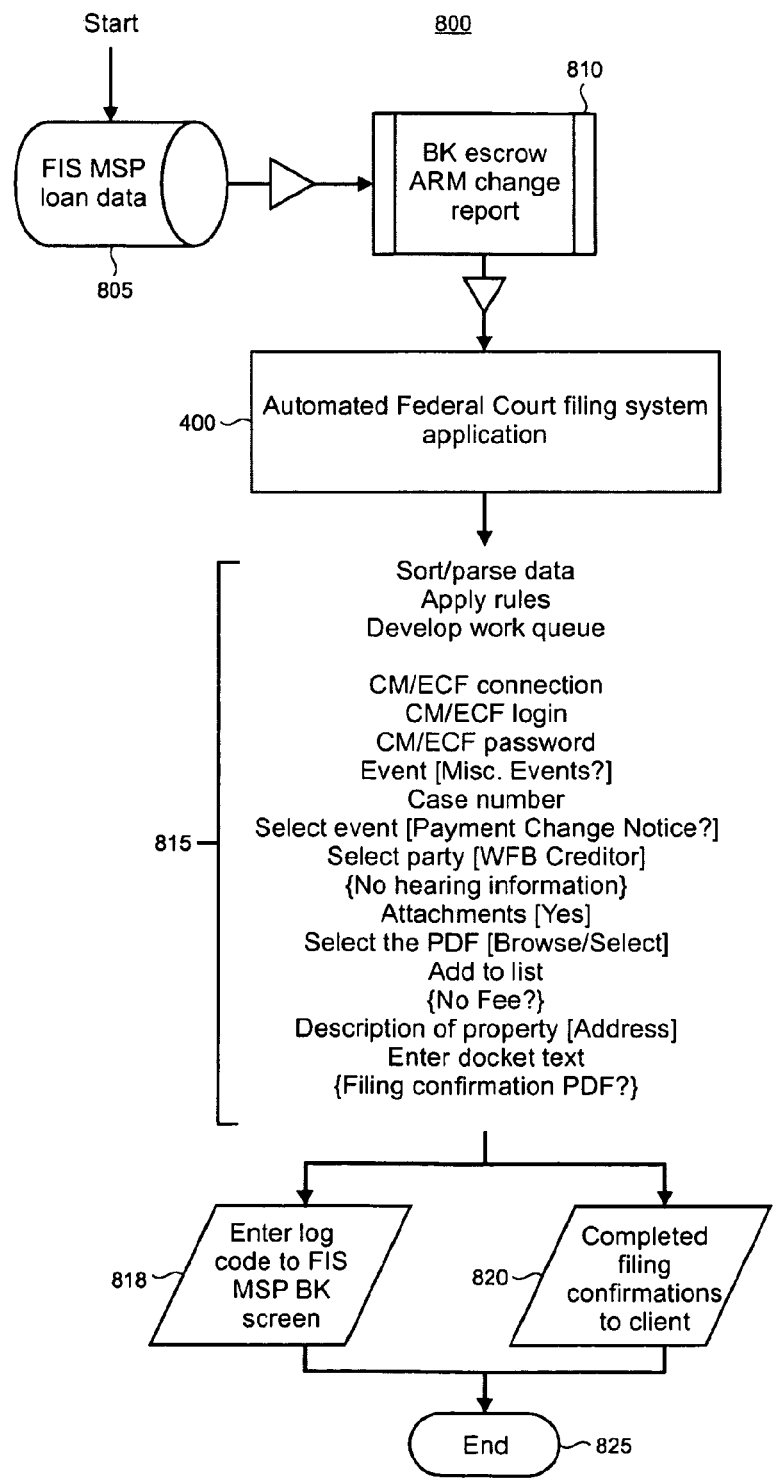
FIG. 8 shows a flowchart of a creditor-initiated filing as may be facilitated using the automated Federal Court filing system.

By comparison to the current process described above, the present automated Federal Court filing system streamlines the filing of a "Notice of Payment Change" by replacing the manual operations, which can often be time-consuming and prone to error, with automated processes. As shown in flowchart 800 in FIG. 8, a report 810 is generated from MSP loan data 805 which operates as the initiating system to trigger execution of automation code. Accordingly, receipt of the report 810 from the initiating system by the automated Federal Court filing system application 400 will trigger execution of appropriate automated processes performed by the various components 405 shown in FIG. 4 and described in the accompanying text, as indicated by reference numeral 815.

The automated Federal Court filing system application 400 will further interface with the MSP system in order to enter the relevant log code, as shown at block 818. At block 820, confirmations of the completed filing are automatically delivered to the client. Flowchart 800 ends at block 825.

FIGS. 9, 9A, 9B, and 9C show a flowchart 900 of a typical attorney-initiated generic filing to a Federal Bankruptcy Court as is currently practiced which requires a substantial number of manual operations. At block 902, if a pleading is required the attorney will initiate a merge of all of the necessary and relevant data at block 905, and make various selections and pick parameters at block 911 in order to generate a document at block 914 typically by utilizing a word processing system.

When the attorney finishes the pleading document with all appropriate changes and edits at block 916, then the attorney will initiate a save of the pleading in the attorney's case management system, as shown at block 918. The saving activity typically encompasses the selection of the file location and name for the pleading document, as shown at block 920.

The attorney will then initiate conversion of the word processing document to a PDF at block 922 which executes the conversion routine at block 924. The attorney will then need to save the PDF version of the pleading in the case management system at block 926 which again encompasses the selection of the file location and name for the PDF version of the pleading document at block 928.

Figure 9:
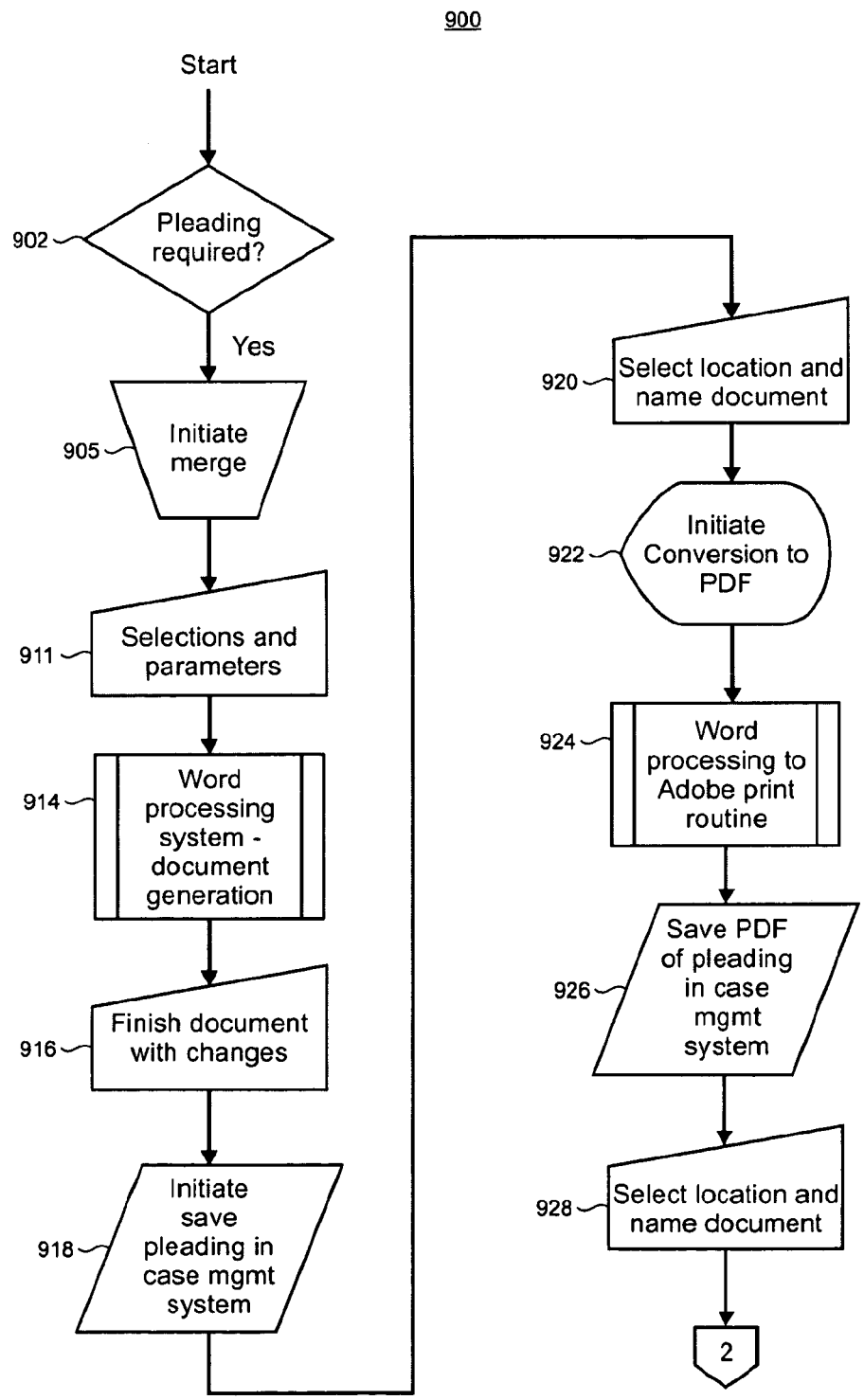
FIGS. 9, 9A, 9B, and 9C show a flowchart of a typical attorney-initiated generic filing to a Federal Bankruptcy Court as is currently practiced which requires a substantial number of manual operations.
Figure 9A:
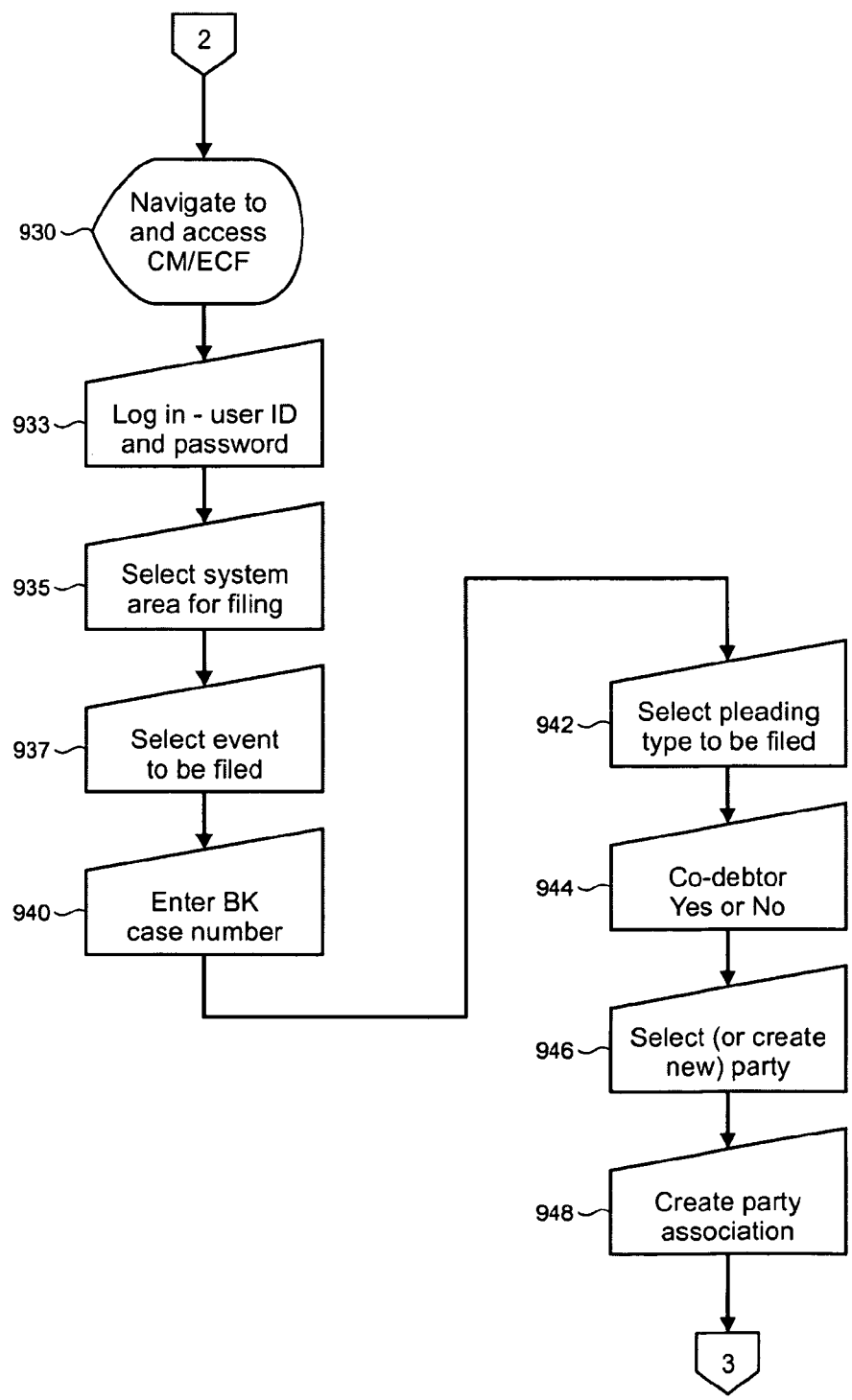

Continuing with FIG. 9A, the attorney will navigate to and access the appropriate CM/ECF web portal at block 930. Working through the CM/ECF web-based UI, the attorney will log in by supplying a user ID and password at block 933, and select a system area for filing at block 935. The relevant CM/ECF event is selected at block 937, and the attorney will enter the relevant bankruptcy case number at block 940. At block 942, the pleading type to be filed is selected. At block 944 a co-debtor is identified when appropriate and a party is selected (or created) at block 946. The appropriate party association is created at block 948.

Figure 9B:
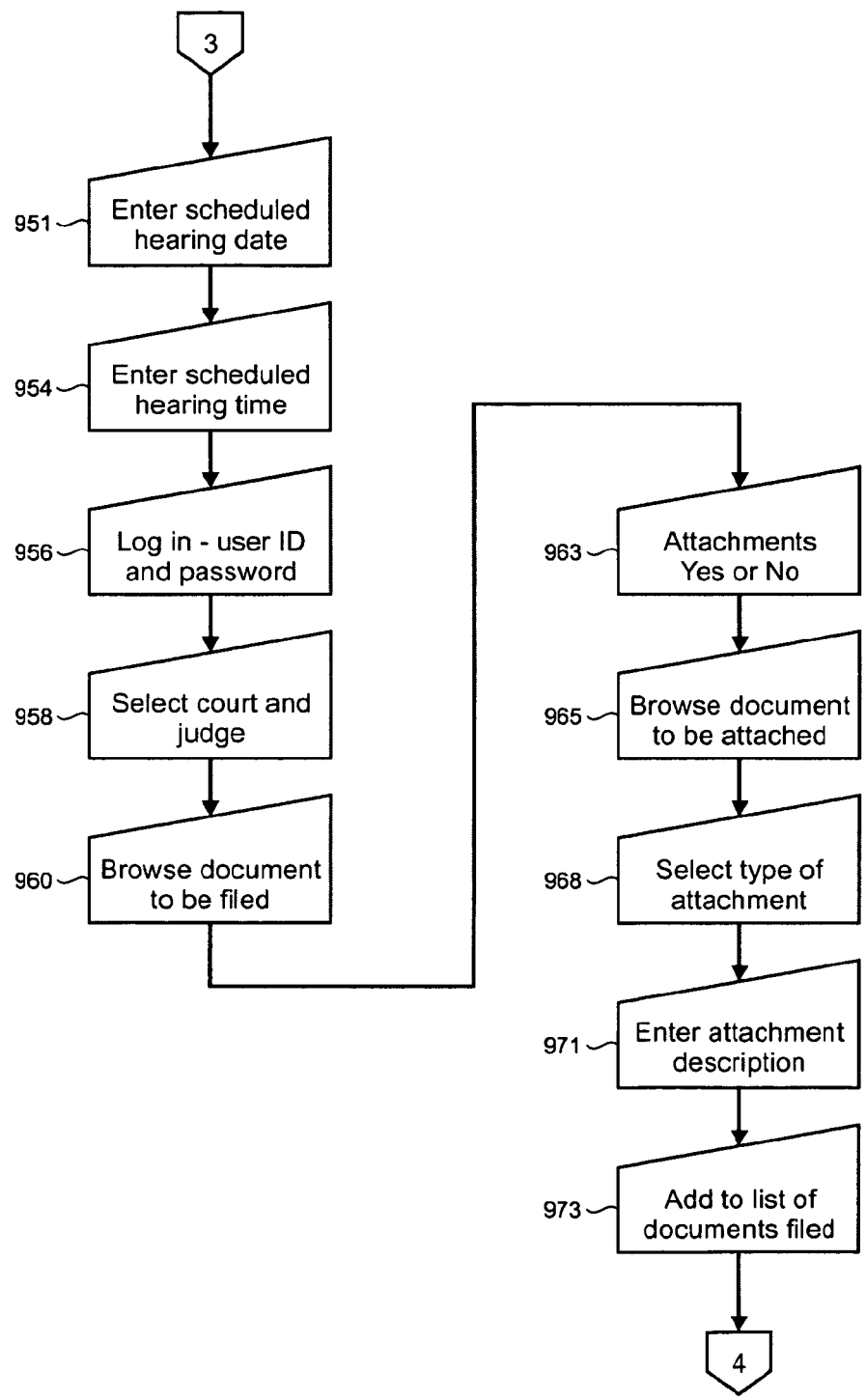

In FIG. 9B, a scheduled hearing date is entered at block 951 and the scheduled hearing time is entered at block 954. Another login is required at block 956 followed by the selection of the court and judge at block 958. The attorney will then browse for documents to be filed at block 960 as well as attachments at block 963. If attachments are part of the filings, then the attorney will select the type of attachment at block 968 and enter an attachment description at block 971. The attachments will be added to the list of documents filed at block 973.

Figure 9C:
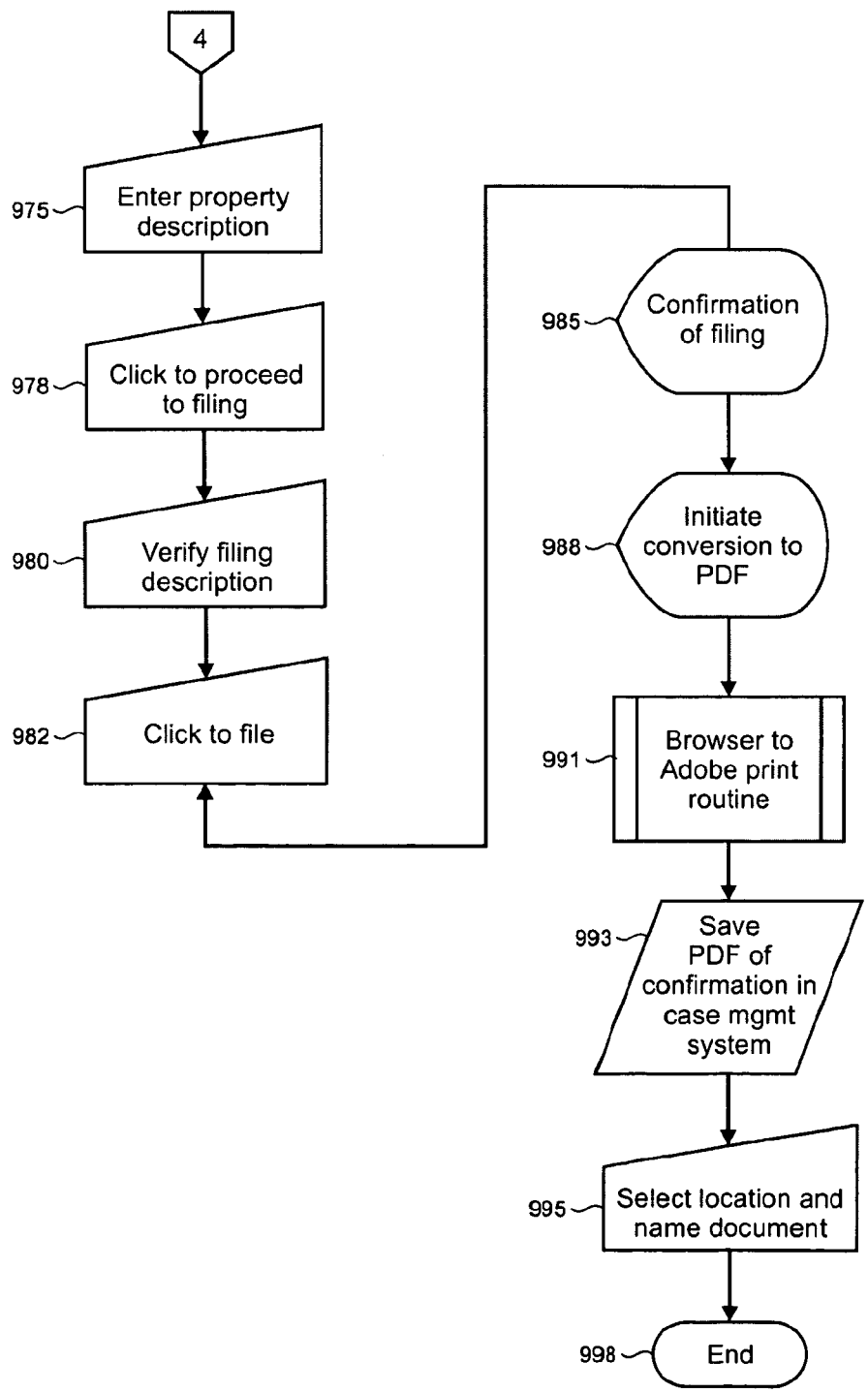

In FIG. 9C, a property description is entered at block 975 and the attorney will click through the CM/ECF web-based UI to proceed to filing at block 978. At block 980, the filing description is verified and another click will initiate the filing at block 982. At block 985, the attorney will receive a confirmation of the filing which is presented on the last page of the CM/ECF filing submission process.

At block 988, the web page containing the filing confirmation displayed in the attorney's browser can be converted to a PDF using the Adobe print routine at block 991. The attorney will then save the filing confirmation in PDF format in the case management system at block 993. This entails a selection of the file location and name for the PDF at block 995. Flowchart 900 ends at block 998.

Figure 10A:
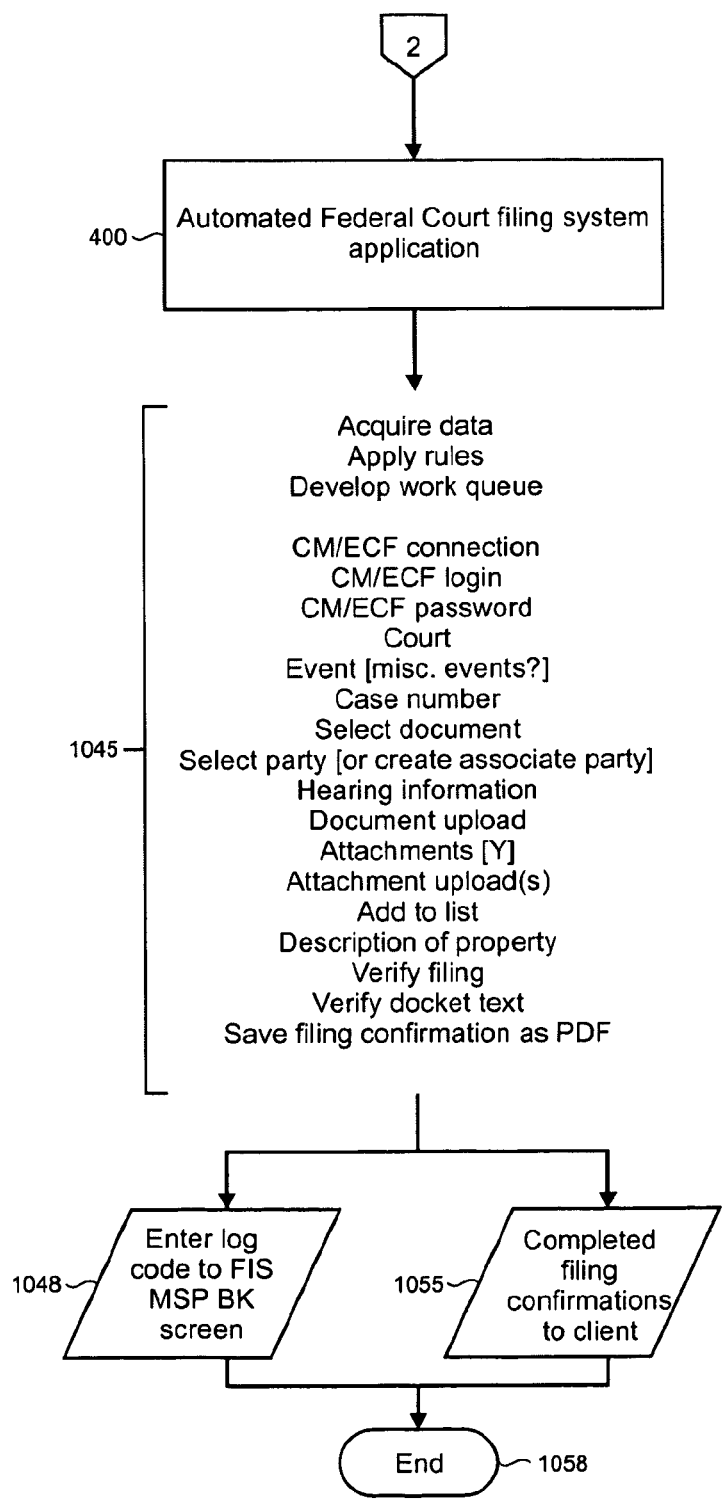

FIGS. 10 and 10A show a flowchart 1000 of a generic attorney-initiated filing to a Federal Bankruptcy Court as may be facilitated using the automated Federal Court filing system. The steps in flowchart 1000 at blocks 1002, 1005, 1011, 1014, 1016, 1018, 1020, 1022, 1024, 1026, and 1028 are similar to the corresponding blocks in FIG. 9.

At block 1030 in FIG. 10, the attorney will interface with the UI to the automated Federal Court filing system application 400 in order to set a CMS filing-required indicator and select the filing type at block 1033 (these actions are also shown in FIGS. 14 and 15 and described in the accompanying text). Such selection will trigger execution of the application 400 as shown in FIG. 10A. The automated Federal Court filing system application 400 will then execute the appropriate automated processes performed by the various components 405 shown in FIG. 4 and described in the accompanying text, as indicated by reference numeral 1045. Such automation replaces the corresponding manual operations which can be quite time consuming for the attorney and prone to error.

The automated Federal Court filing system application 400 will further interface with the MSP system in order to enter the relevant log code, as shown at block 1048. At block 1055, confirmations of the completed filing are automatically delivered to the client. Flowchart 1000 ends at block 1058.

Figure 11:
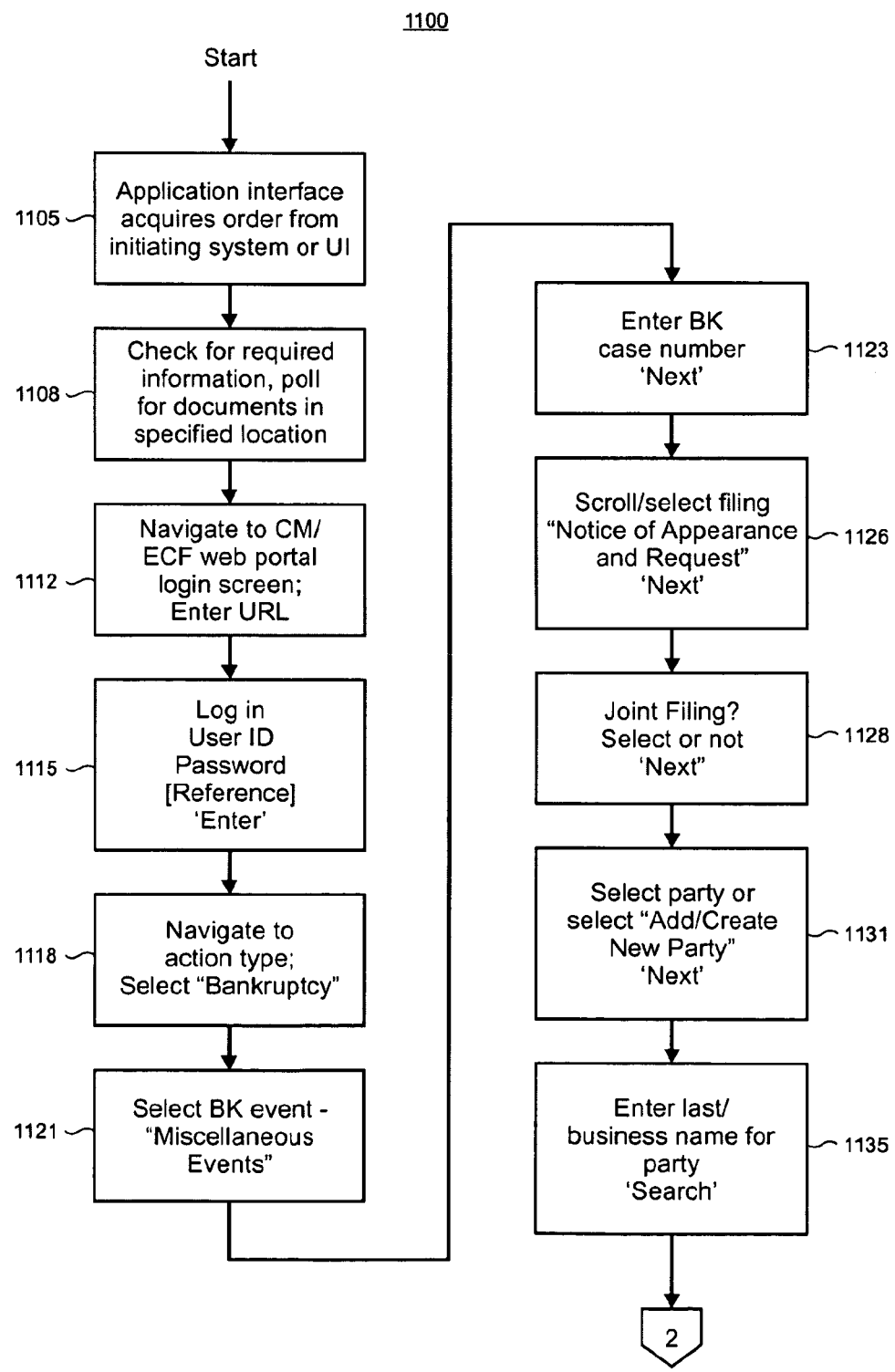
FIGS. 11 and 11A show a flowchart of an automated filing process for an attorney-initiated "Notice of Appearance" filing.
Figure 12:
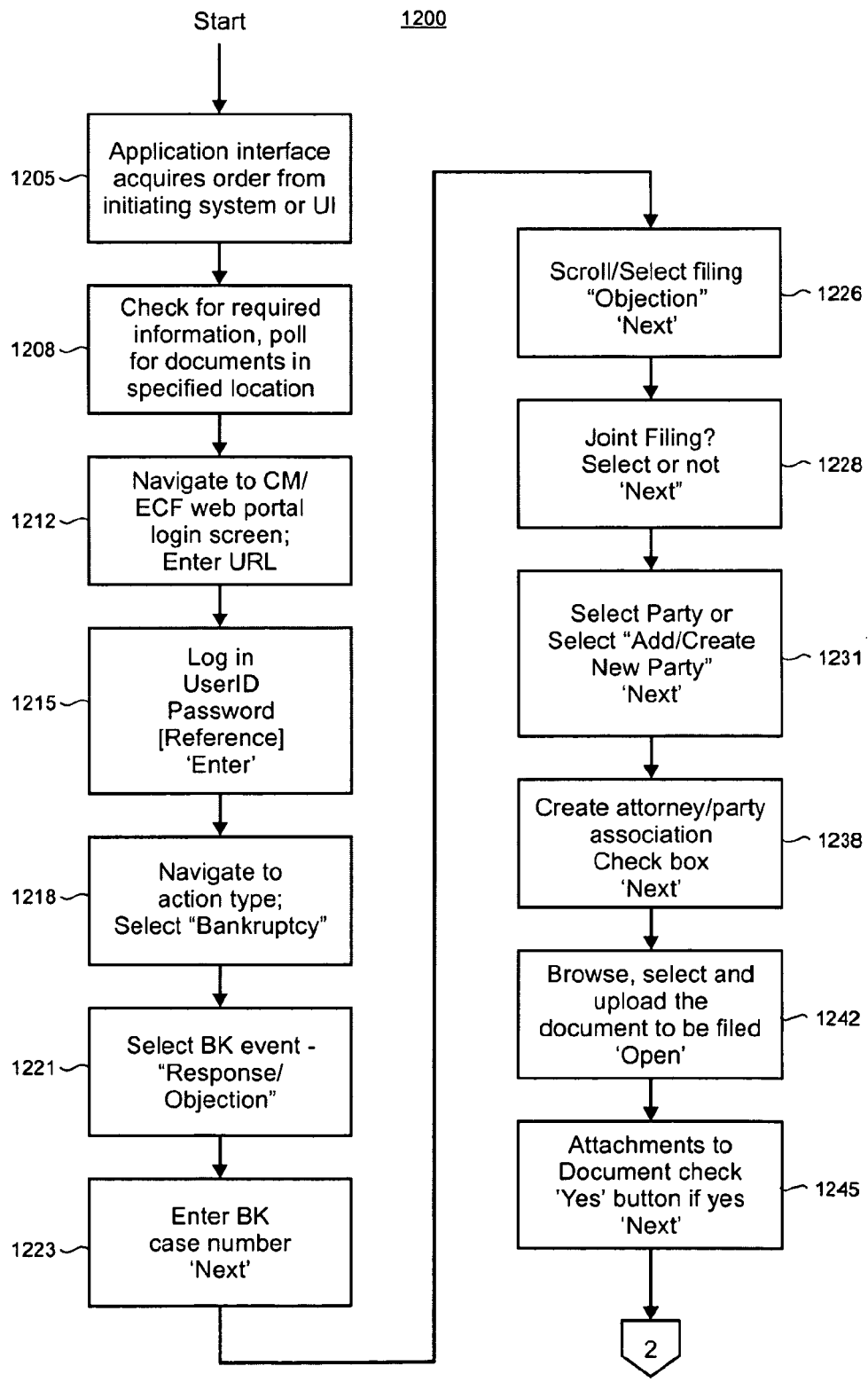
FIGS. 12 and 12A show a flowchart of an automated filing process for an attorney-initiated "Objection to Confirmation of Plan" filing.
Figure 13:
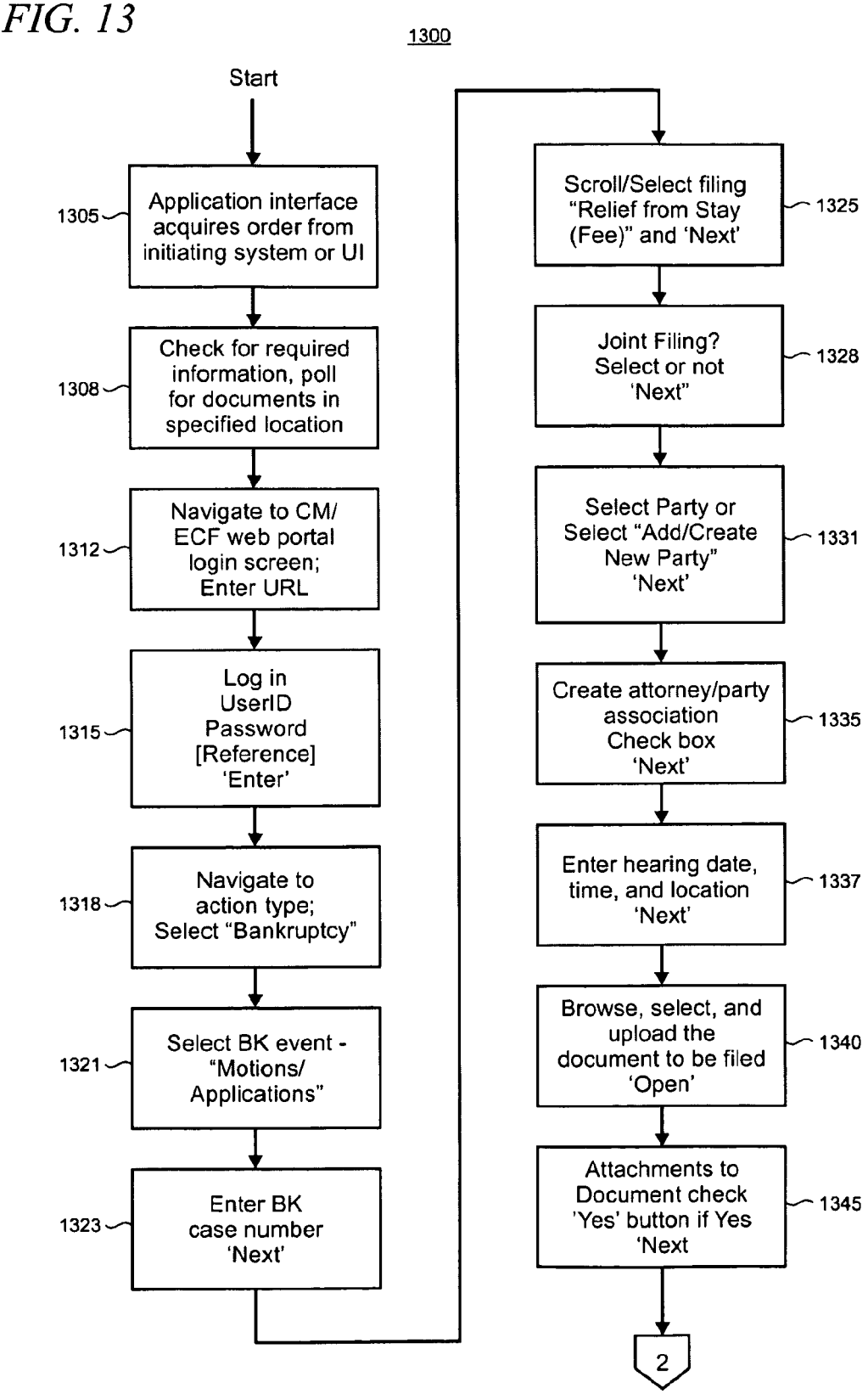
FIGS. 13, 13A, and 13B show a flowchart of an automated filing process for an attorney-initiated "Motion for Relief from Stay" filing.

FIGS. 11-13 depict several illustrative automated process flows associated various CM/ECF filings that are executed by the automated Federal Court filing system application 400. However, the particular CM/ECF filings shown and described are intended to be illustrative and should not be construed as limitations on the scope of the present arrangement.

It is noted that the process flows shown would ordinarily be performed as manual tasks by a human resource interfacing with the CM/ECF web-based UI. It is further noted that the application 400 interacts with the CM/ECF web portals and provides the functionality described herein without requiring any modifications to the existing portal architectures or interfaces. FIGS. 11-13 further serve to highlight the significant savings in time and costs (as well as an improvement in accuracy) that can be expected to be achieved through utilization of the present automated Federal Court filing system.

Figure 11A:
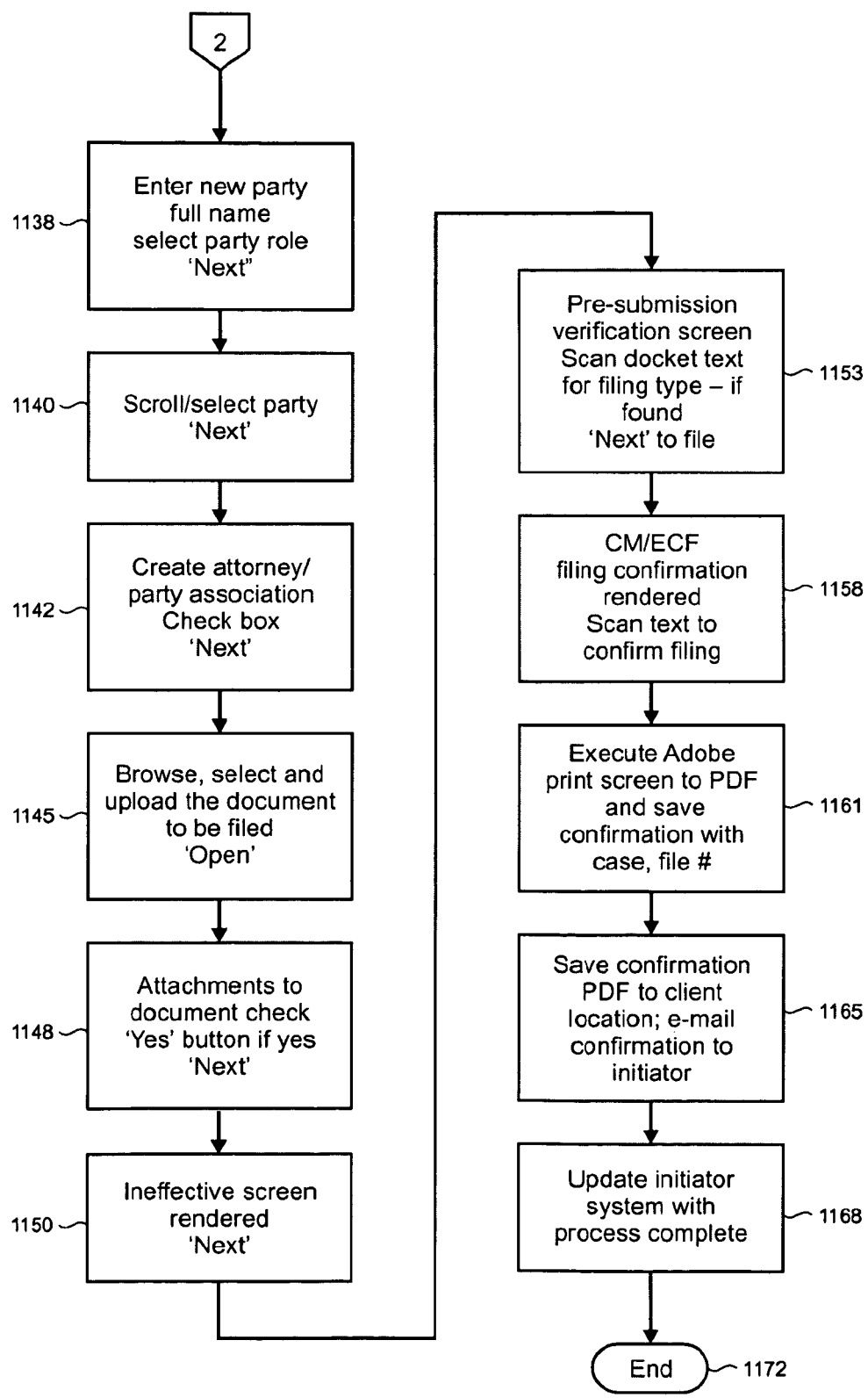

FIGS. 11 and 11A show an illustrative automated process flow 1100 for a Notice of Appearance filing. The automated Federal Court filing system application 400 begins execution when the application interface either acquires an order from an initiating system or the UI, as shown at block 1105. The application 400 will check for the required information necessary for the filing submission to the court and poll for documents at specified locations, as shown at block 1108. At block 1112, the application 400 will navigate to the relevant CM/ECF web portal for login by entering the appropriate URL (Uniform Resource Locator).

The automated Federal Court filing system application 400 will enter the user's login credentials including a user ID and password, as well as specify an internal reference number in some circumstances as shown at block 1115. At block 1118, the application 400 will navigate through the CM/ECF web-based UI to the action type menu and will select "Bankruptcy." At block 1121, the bankruptcy event "Miscellaneous Events" is selected. The application 400 then enters the relevant bankruptcy case number and actuates the 'Next' button through the CM/ECF web-based UI, as indicated at block 1123, to advance to the next web page.

At block 1126, the application 400 will scroll through the relevant menu and select the desired filing "Notice of Appearance and Request" and actuates the 'Next' button on the UI. At block 1128, if a joint filing is required, then it will be selected from the UI, and the automated Federal Court filing system application 400 will actuates the 'Next' button. At block 1131, a party who is initiating the filing will be selected or a new party will be added/created and the 'Next' button on the UI is actuated. If a match to an existing party cannot be made, the application 400 will then enter the last name or business name for the party, at block 1135, and actuates the 'Search' button on the CM/ECF UI.

Continuing with FIG. 11A, the automated Federal Court filing system application 400 will enter the full name of the new party if the party cannot be found using the CM/ECF search facility, select the party role (e.g., creditor, debtor, debtor in possession, plaintiff, realtor, etc.), and actuates the 'Next' button on the UI, as shown at block 1138. At block 1140, the application 400 will scroll/select the party and actuate the 'Next' button to advance to the next page. At block 1142, an attorney/party association is created by checking an appropriate check box on the page, and the application 400 actuates the 'Next' button to advance to the next page.

At block 1145, the automated Federal Court filing system application 400 will browse, select, and upload the appropriate documents to be filed. When a file-able document in PDF format is located, the application 400 will actuate the 'Open' button (on the web browser file system navigation window). At block 1148, if attachments to a document are to be filed, then a checkbox is checked and the application 400 actuates the 'Next' button to advance to the next page. At block 1150, the CM/ECF UI renders an ineffective screen which is clicked through with the 'Next' button by the application 400.

A pre-submission verification screen is provided next which contains text that the automated Federal Court filing system application 400 will scan to match required text for filing, as shown at block 1153. The application 400 will actuate the 'Next' button. At block 1158, the CM/ECF web-based UI renders a confirmation of filing page. The application 400 scans the text to ensure the filing is complete and correct. After verifying that the filing is correct, at block 1161, the webpage of the confirmation will be captured as a PDF document using the print screen functionality and then saved with the filing type, court case number, and initiator or file number.

At block 1165, the PDF confirmation is stored at a client location, and the application 400 generates an e-mail confirmation to the initiator. The initiator's system is updated with the date, time, type of filing, and confirmation code for the filing at block 1168. Flowchart 1100 ends at block 1172.

Figure 12A:
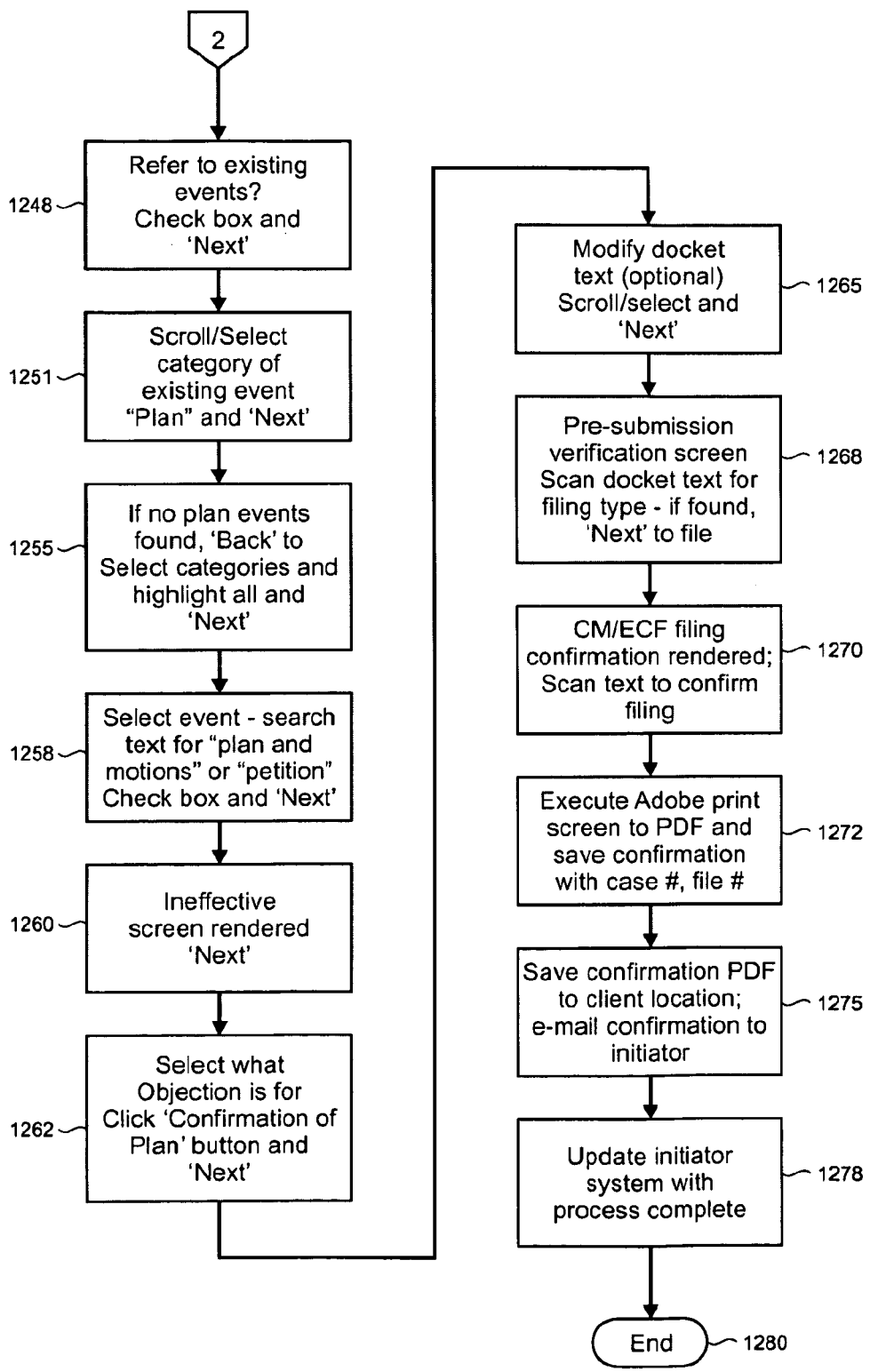

FIGS. 12 and 12A show an illustrative automated process flow 1200 for an "Objection to Confirmation of Plan" filing. The automated Federal Court filing system application 400 begins execution when the application interface either acquires an order from an initiating system or the UI, as shown at block 1205. The application 400 will check for the required information necessary for the filing submission to the court and poll for documents at specified locations, as shown at block 1208. At block 1212, the application 400 will navigate to the relevant CM/ECF web portal for login by entering the appropriate URL.

The automated Federal Court filing system application 400 will enter the user's login credentials including a user ID and password, as well as specify an internal reference number in some circumstances as shown at block 1215. At block 1218, the application 400 will navigate through the CM/ECF web-based UI to the action type menu and will select "Bankruptcy." At block 1221, the bankruptcy event "Response/Objection" is selected. The application 400 then enters the relevant bankruptcy case number and actuates the 'Next' button through the CM/ECF web-based UI, as indicated at block 1223, to advance to the next web page.

At block 1226, the application 400 will scroll through the relevant menu and select the desired filing "Objection" and actuates the 'Next' button on the UI. At block 1228, if a joint filing is required, then it will be selected from the UI, and the automated Federal Court filing system application 400 will actuates the 'Next' button. At block 1231, a party who is initiating the filing will be selected or a new party will be added/created and the 'Next' button on the UI is actuated. At block 1238, an attorney/party association is created by checking an appropriate check box on the page, and the application 400 actuates the 'Next' button to advance to the next page.

At block 1242, the automated Federal Court filing system application 400 will browse, select, and upload the appropriate documents to be filed. When a file-able document in PDF format is located, the application 400 will actuate the 'Open' button (on the web browser file system navigation window). At block 1245, if attachments to a document are to be filed then a checkbox is checked and the application 400 actuates the 'Next' button to advance to the next page.

Continuing with FIG. 12A, if the objection refers to existing events then a check box is checked and the application 400 will actuate the 'Next' button, as shown at block 1248. At block 1251, the application 400 will then scroll and select the category to which the event relates (which in this case is "plan") and the 'Next' button is actuated. If no "plan" events are located then the automated Federal Court filing system application 400 will go back to the previous page to highlight all available categories from the menu and then actuate the 'Next' button to advance to the next page, as shown at block 1255.

At block 1258, the appropriate event is selected by searching the text of all the listed event(s) for the terms "plan and motions" or "petition." Events containing the terms are checked through and the application 400 actuates the 'Next' button. At block 1260, the CM/ECF UI renders an ineffective screen which is clicked through with the 'Next' button by the application 400.

At block 1262, the automated Federal Court filing system application 400 will select what the objection is for, and click the 'Confirmation of Plan' button on the UI and 'Next.' At block 1265, the docket text may be optionally modified as appropriate. The application 400 then actuates the 'Next' button to advance to the next page.

A pre-submission verification screen is provided next which contains text that the automated Federal Court filing system application 400 will scan to match required text for filing, as shown at block 1268. The application 400 will actuate the 'Next' button. At block 1270, CM/ECF web-based UI renders a confirmation of filing page. The application 400 scans the text to ensure the filing is complete and correct. After verifying that the filing is correct, at block 1272, the webpage of the confirmation will be captured as a PDF document using the print screen functionality and then be saved with the filing type, court case number, and initiator or file number.

At block 1275, the PDF confirmation is stored at a client location, and the application 400 generates an e-mail confirmation to the initiator. The initiator's system is updated with the date, time, type of filing, and confirmation code for the filing at block 1278. Flowchart 1200 ends at block 1280.

Figure 13A:
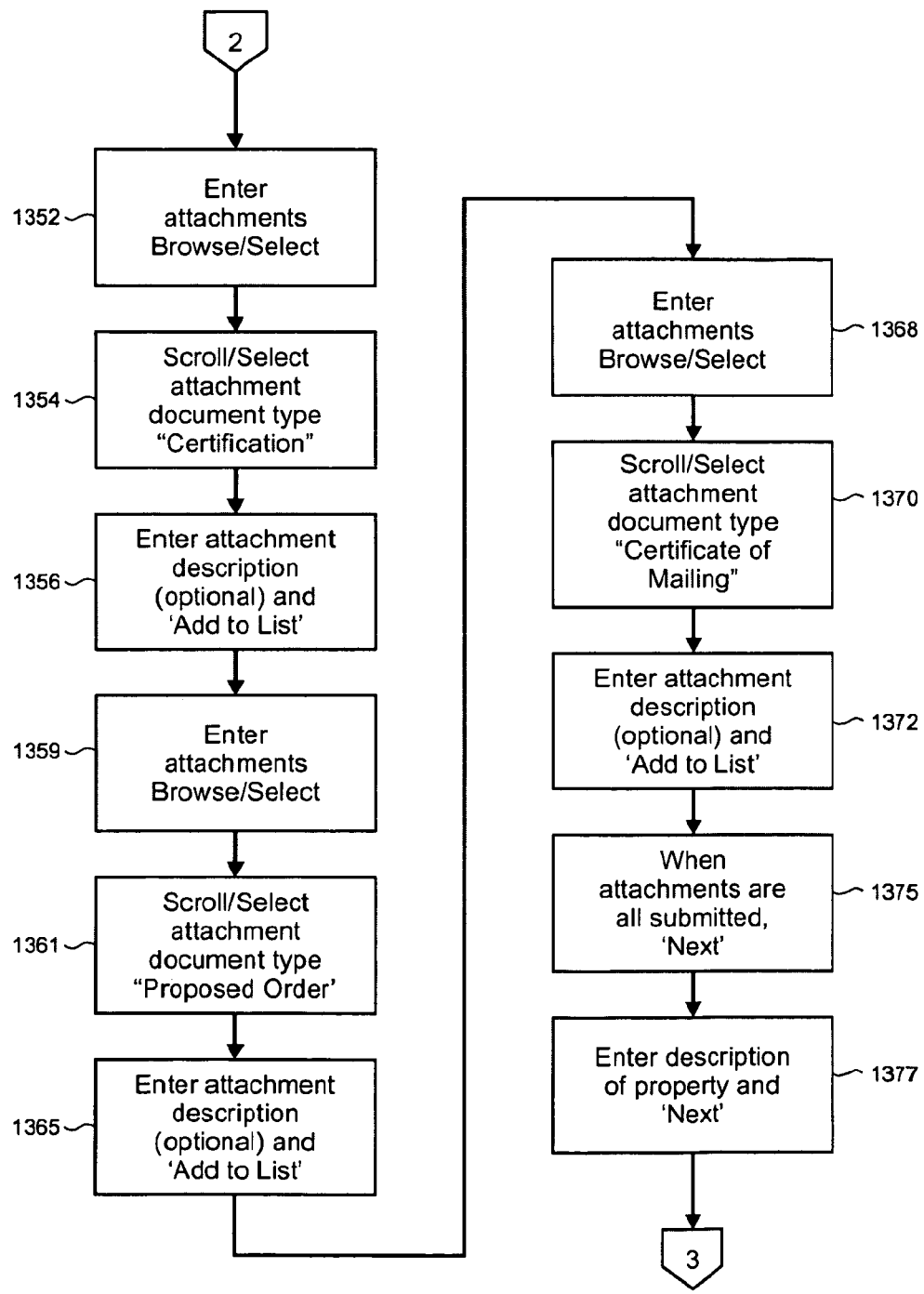
Figure 13B:
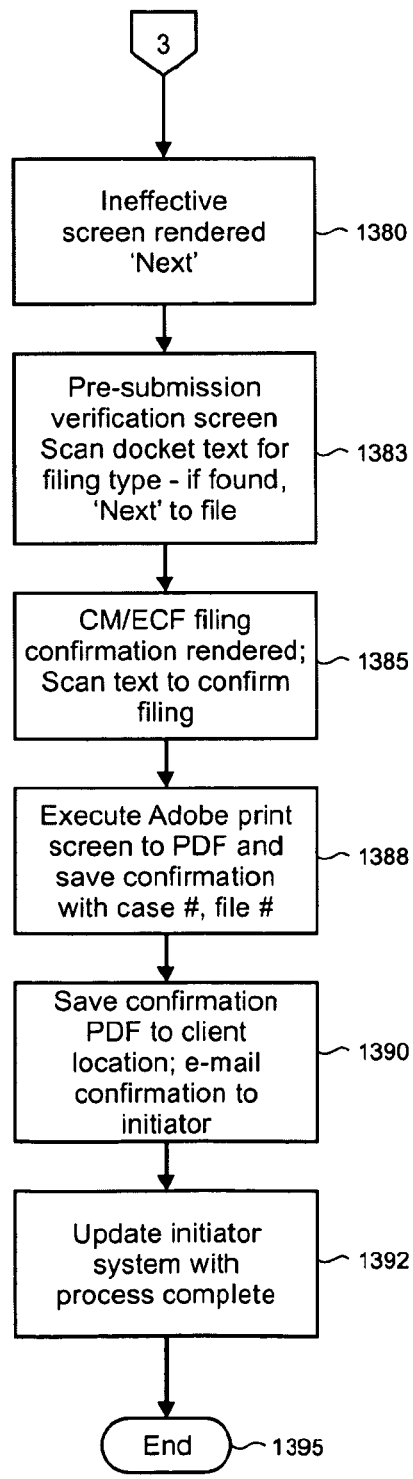

FIGS. 13, 13A, and 13B show an illustrative automated process flow 1300 a "Motion for Relief from Stay" filing. The automated Federal Court filing system application 400 begins execution when the application interface either acquires an order from an initiating system or the UI, as shown at block 1305. The application 400 will check for the required information necessary for the filing submission to the court and poll for documents at specified locations, as shown at block 1308. At block 1312, the application 400 will navigate to the relevant CM/ECF web portal for login by entering the appropriate URL.

The automated Federal Court filing system application 400 will enter the user's login credentials including a user ID and password, as well as specify an internal reference number in some circumstances as shown at block 1315. At block 1318, the application 400 will navigate through the CM/ECF web-based UI to the action type menu and will select "Bankruptcy." At block 1321, the bankruptcy event "Motions/Applications" is selected. The application 400 then enters the relevant bankruptcy case number and actuates the 'Next' button through the CM/ECF web-based UI, as indicated at block 1323, to advance to the next web page.

At block 1325, the application 400 will scroll through the relevant menu and select the desired filing "Relief from Stay (Fee)" and actuate the 'Next' button on the UI. At block 1328, if a joint filing is required, then it will be selected from the UI, and the automated Federal Court filing system application 400 will actuate the 'Next' button. At block 1331, a party who is initiating the filing will be selected or a new party will be added/created and the 'Next' button on the UI will be actuated. At block 1335, an attorney/party association is created by checking an appropriate check box on the page, and the application 400 actuates the 'Next' button to advance to the next page.

At block 1337, the automated Federal Court filing system application 400 will enter the appropriate hearing date, time, and location into the respective pages provided by the CM/ECF UI. At block 1340, the automated Federal Court filing system application 400 will browse, select, and upload the appropriate documents to be filed. When a file-able document in PDF format is located, the application 400 will actuate the 'Open' button (on the web browser file system navigation window). At block 1345, if attachments to a document are to be filed then a checkbox is checked and the application 400 actuates the 'Next' button to advance to the next page.

Continuing with FIG. 13A, at block 1352, the application 400 will browse/select the relevant attachments. In this example, a first attached document type is selected as "Certification'" as indicated at block 1354. At block 1356, an attachment description is optionally utilized and the attachment is added to a list via actuation of the respective button on the UI. A second attached document is browsed for and selected at block 1359 and its document type is selected as 'Proposed Order' at block 1361. The second attachment is added to the attachment list at block 1365. A third attached document is also browsed for and selected at block 1368 and its document type is selected as "Certificate of Mailing" at block 1370. The third attachment is added to the attachment list at block 1372. At block 1375, when all the attachments are submitted, the application 400 will actuate the 'Next' button to advance to the next page. At block 1377 a description of the property is entered and the 'Next' button is actuated.

Continuing with FIG. 13B, at block 1380, the CM/ECF UI renders an ineffective screen which is clicked through with the 'Next' button by the automated Federal Court filing system application 400. A pre-submission verification screen is provided next which contains text that the automated Federal Court filing system application 400 will scan to match required text for filing, as shown at block 1383. The application 400 will actuate the 'Next' button. At block 1385, the CM/ECF web-based UI renders a confirmation of filing page. The application 400 scans the text to ensure the filing is complete and correct. After verifying that the filing is correct, at block 1388, the webpage of the confirmation will be captured as a PDF document using the print screen functionality and then saved with the filing type, court case number, and initiator or file number.

At block 1390, the PDF confirmation is stored at a client location, and the application 400 generates an e-mail confirmation to the initiator. The initiator's system is updated with the date, time, type of filing, and confirmation code for the filing at block 1392. Flowchart 1300 ends at block 1395.

FIGS. 14-20 show various screens provided by the UI to the automated Federal Court filing system application 400 that is supported, in this example, by the UI component 405₁ shown in FIG. 4 and described in the accompanying text. In alternative implementations, the UI can be rendered using a thin client application such as a web browser.

Screen 1400 in FIG. 14 shows the basic input screen to the application 400. As shown, the UI provides a number of control and display objects (collectively identified by reference numeral 1405) such as checkboxes, text input fields, drop-down menus, and buttons (e.g., 'Save,' 'Cancel,' 'Refresh') to enable a user 210 to specify the fundamental parameters that define a given court filing and select the primary document and attachments that constitute the filing.

Screen 1500 in FIG. 15 shows how three data entries are required in order to initiate code execution in the application 400. These include a check in the 'Filing Required' check box 1505, a file number 1513 (i.e., a user reference number), and a selection of the filing type from the drop-down menu 1516.

In this example the filing type is 'Motion for Relief from Stay'. However, as indicated in screen 1600 in FIG. 16, the drop-down menu 1516 includes a variety of filing types (as indicated by reference numeral 1608) from which the user 210 may select.

Figure 18:
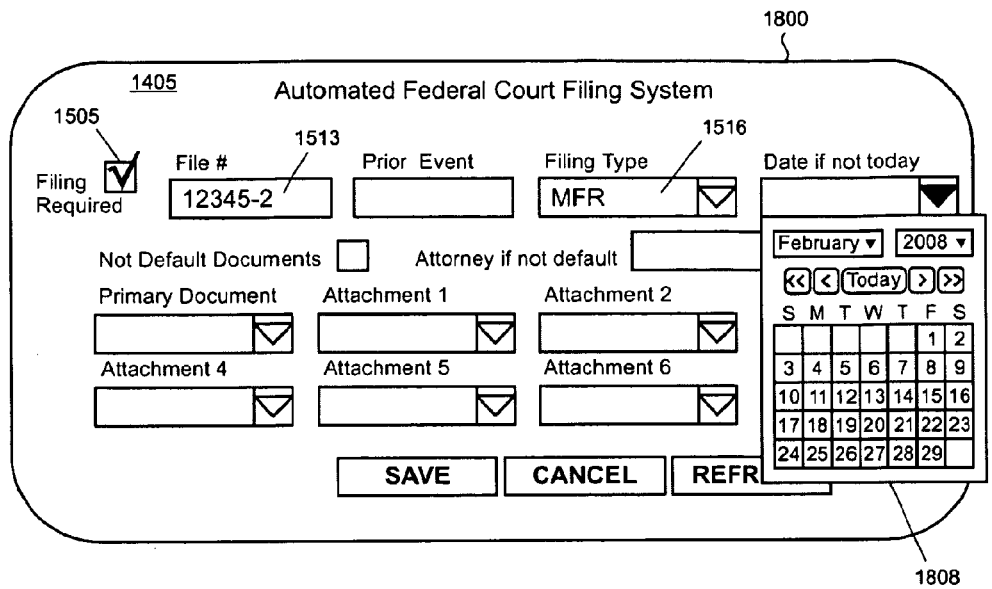

Screen 1700 in FIG. 17 shows the utilization of an optional entry in the 'Prior Event' text entry field 1706. Here, a prior event reference will act as an override to the automated Federal Court filing system application data acquisition and storage functionality. Screen 1800 in FIG. 18 shows another optional entry where a user 210 may select a future filing date using a calendar tool 1808. In cases where the user 210 attempts to specify an inappropriate filing date (e.g., a date that is earlier than a prior filing date), then the UI will return an error.

Figure 19:
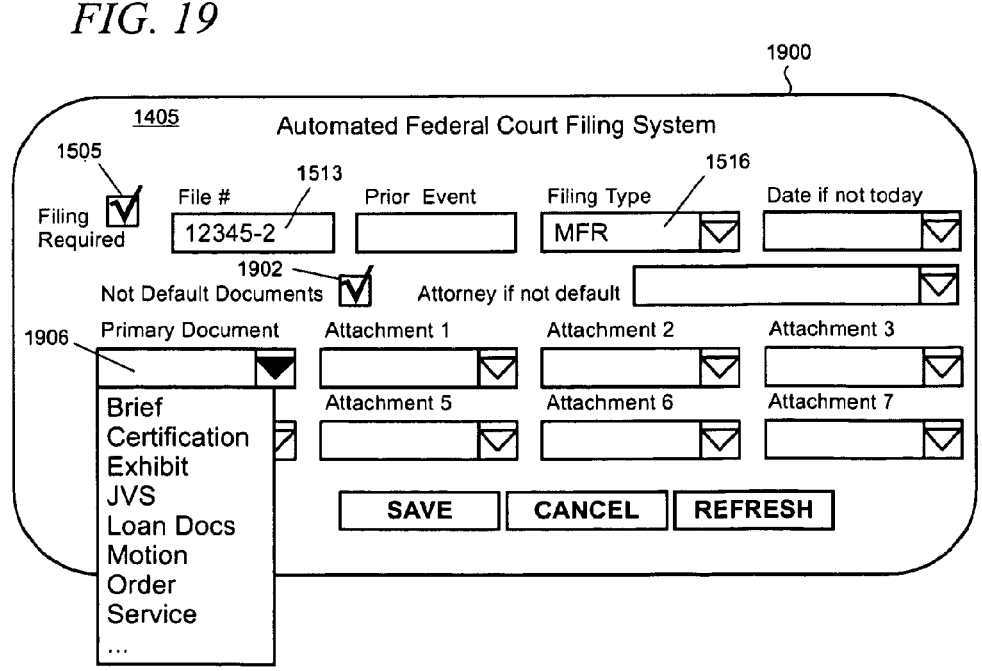

Screen 1900 in FIG. 19 shows the utilization of another optional entry. In this example, if the 'Not Default Documents' checkbox 1902 is checked, then user-specified documents may be utilized which will override the default requirements mapping performed by the application 400. This feature enables non-standard document types to be uploaded in a sequence that the user 210 designates. Screen 1900 also shows the primary document types that are available from the drop-down menu 1906.

Figure 20:
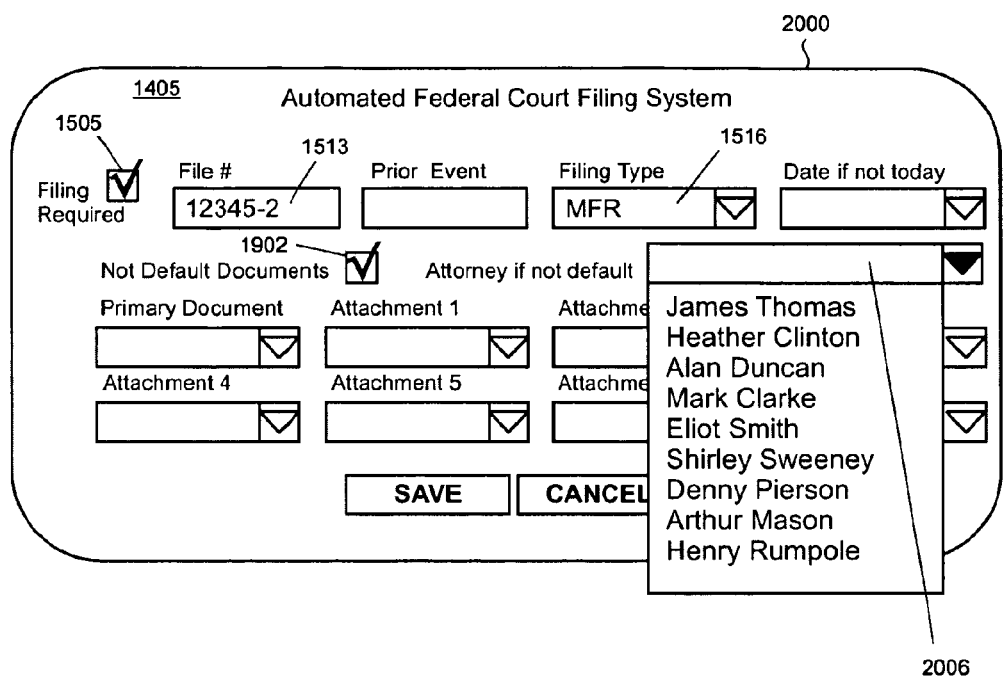

Screen 2000 in FIG. 20 shows utilization of another optional entry. Here, the user 210 may specify the representing attorney. This specification will override the automated Federal Court filing system application automated user selection routines which are normally based on user system data. Drop-down menu 2006 indicates a number of attorneys that can be specified other than the default attorney.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A program product for automating a filing to an electronic submission portal, the program product including one or more non-transitory storage media on which executable program code is recorded, the executable program code comprising:
  a data acquisition component that, when executed by one or more processors in the computing platform, is configured to acquire data from one or more source systems and extract data components utilized in the filing;
  a filing creation component that, when executed by one or more processors disposed in the computing platform, is configured to merge one or more of the extracted data components into the filing;
  a filing completion component that is configured to create automated workflow routines for the filing that are compatible with the electronic submission portal, monitoring errors at the electronic submission portal, adapting one or more of the automated workflow routines in response to a first of one or more errors, discontinuing one or more of the automated workflow routines in response to a second of one or more errors, and aborting the filing in response to a third of one or more errors so that incorrect filings do not occur, and
  a polling component that is configured to poll a docket and execute decision-making to identify associated filings with prior docketed events or other registered events or data from the polled docket for inclusion in the filing, the polling component being further configured for mining docket data to locate CM/ECF (Case Management/Electronic Case Filing) events that satisfy applicable requirements for cross-references for the identified associated filings, the cross-references including one of either a prior docket entry for the filing or an adversary case filing.

2. The program product of claim 1 in which the filing is one of filing with a court, a Federal court, a non-governmental agency, a governmental agency, a financial institution, a data intermediary, or an investor.

3. The program product of claim 1 in which the electronic submission portal is associated with one of court, Federal court, non-governmental agency, governmental agency, financial institution, data intermediary, or investor.

4. The program product of claim 1 in which the electronic submission portal is a Case Management/Electronic Case Filing (CM/ECF) web portal.

5. The program product of claim 1 in which at least one of the source systems is a case management system or loan servicing system.

6. The program product of claim 1 in which the data acquisition component is further configured to store the extracted data components.

7. The program product of claim 1 in which the data acquisition component is further configured to execute error handling during data acquisition from the one or more source systems.

8. The program product of claim 1 in which the data acquisition component is further configured to generate status messages or error messages.

9. The program product of claim 1 in which the filing creation component is further configured to merge the extracted data into one or more word processing templates using variable entries.

10. The program product of claim 1 further including one or more storage media on which resources are recorded, the resources including at least one of logic, rules, document templates, text, variables, macros, scripts, and search strings.

11. The program product of claim 10 in which at least one of the resources is parameterized.

12. The program product of claim 1 in which the executable program code further comprises a user identification (ID) and password storage component that is configured to store login credentials for users.

13. The program product of claim 12 in which the user identification (ID) and password storage component is further configured to handle the login credentials using security relationships to maintain the login credentials on a client-segregated basis.

14. The program product of claim 12 in which the user identification (ID) and password storage component is further configured to implement error and message handling.

15. The program product of claim 1 in which the executable program code further comprises an electronic submission portal interface component that is configured to implement automated interaction with the electronic submission portal that substantially mimics human interaction.

16. The program product of claim 15 in which the electronic submission portal interface component includes cataloged navigation paths for navigating to one or more different electronic submission portal locations.

17. The program product of claim 1 in which the executable program code further comprises an error and message handling component that is configured to monitor errors that occur during a filing submission to the electronic submission portal and responding to the errors as required to complete the filing.

18. The program product of claim 17 in which the error and message handling component is further configured to generate messages responsively to the monitored errors.

19. The program product of claim 1 in which the executable program code further comprises a confirmation and receipt capture component that is configured to confirm completion of a filing with the electronic submission portal and capturing a filing receipt or filing receipt data.

20. The program product of claim 1 in which the executable program code further comprises a message delivery component that is configured to deliver messages to indicate status or alerts, the status messages including ones of confirmations of successful filings or error messages pertaining to reasons for unsuccessful navigation within web pages provided by the electronic submission portal or unsuccessful filings, the alerts including ones of system alerts, errors, or messages.

21. The program product of claim 20 in which the message delivery component is further configured to deliver activity data that is indicative of utilization of the program product or resources.

22. The program product of claim 20 in which the message delivery component is further configured to deliver messages using one of e-mail, file transfer protocol (FTP), web service, or other system-to-system communication.

23. The program product of claim 1 in which the executable program code further comprises a user interface (UI) component that is configured to provide a user interface (UI) for capturing or changing filing parameters, returning error messages, enabling withdrawal of orders, or for initiating execution of the executable program code.

24. One or more computer-readable non-transitory storage media containing instructions which, when executed by one or more processors disposed in an electronic device, implement a method for performing automated filings to various ones of web portals that are configured to accept filings electronically, the method comprising the steps of:
receiving parameters through a user interface (UI) from a user, the parameters providing definition for a filing;
acquiring data for the filing from a data source;
generating the filing from the acquired data so that the filing meets the filing parameters;
navigating to a specific web portal to which submission of the filing is appropriate;
executing one or more workflow routines for performing a submission of the filing to the web portal;
polling a docket and executing decision-making to identify associated filings with prior docketed events or other registered events or data from the polled docket for inclusion in the filing, the polling further comprising mining docket data to locate CM/ECF (Case Management/Electronic Case Filing) events that satisfy applicable requirements for cross-references for the identified associated filings, the cross-references including one of either a prior docket entry for the filing or an adversary case filing;
monitoring errors as they occur during the submission; and
modifying the one or more workflow routines or rerunning the workflow routines or aborting the filing in response to the monitored errors.

25. The one or more computable-readable non-transitory storage media of claim 24 in which the one or more workflow routines are determined by the application of at least one of logic, rules, document templates, text, variables, macros, scripts, or search strings.

26. The one or more computer-readable non-transitory storage media of claim 24 in which the method includes a further step of generating error and status messages and delivering the messages to the user.

27. The one or more computer-readable non-transitory storage media of claim 24 in which the steps of acquiring, generating, navigating, and executing are performed automatically without intervention from the user.

28. The one or more computer-readable non-transitory storage media of claim 24 in which the method includes a further step of polling a docket associated with the filing in order to determine a relationship with prior docketed events or other registered events or data.

29. The one or more computer-readable non-transitory storage media of claim 24 in which the user is associated with one of law firm, creditor, or other class of registered filer.

30. The one or more computer-readable non-transitory storage media of claim 24 in which the web portal is associated with one of court, governmental entity, non-governmental entity, or agency.

31. A hosting service for enabling filings to be submitted in an automated manner to an electronic submission portal by one or more groups of users that access the hosting service via a network, comprising:
one or more servers, each of the servers being coupled to the network and storing executable program code on one or more storage media, the executable program code including i) a code component for acquiring filing data from at least one data source, ii) a code component for generating filings from the acquired data, iii) a component for performing submission of the generated filing to the electronic submission portal, the component for performing submission being configured to create automated workflow routines for the filing that are compatible with the electronic submission portal, monitoring errors at the electronic submission portal, adapting one or more of the automated workflow routines in response to a first of one or more errors, discontinuing one or more of the automated workflow routines in response to a second of one or more errors, and aborting a filing in response to a third of one or more errors and iv) a component for polling a docket and executing decision-making to identify associated filings with prior docketed events or other registered events or data from the polled docket for inclusion in the filing, the polling component being further configured for mining docket data to locate CM/ECF (Case Management/Electronic Case Filing) events that satisfy applicable requirements for cross-references for the identified associated filings, the cross-references including one of either a prior docket entry for the filing or an adversary case filing;

a client computing platform interface for interfacing the one or more servers with one or more client computing platforms utilized by the user groups and for receiving an initiation of a filing from a user and an associated filing type; and a data source interface for interfacing the one or more servers to the at least one data source.

32. The hosting service of claim 31 in which various ones of the client computing platforms utilize a user interface (UI) to the hosting service that is implemented using one of thin client or thick client.

33. The hosting service of claim 31 in which the executable program code further includes iv) a code component for error and message handling.

34. The hosting service of claim 33 in which the executable program code further includes v) a code component for confirmation and capture of a completed filing receipt or receipt data.

35. The hosting service of claim 34 in which the executable program code further includes vi) a code component for determining a relationship with prior docketed events, or other registered events or data to be associated with a filing.

36. The hosting service of claim 35 in which the executable program code further includes vii) a code component for interfacing with the electronic submission portal.

37. The hosting service of claim 31 in which the executable program code further includes viii) a code component for storing user identifications (IDs) and associated passwords required for accessing the electronic submission portal.

38. The hosting service of claim 37 in which the storing is subject to security to segregate user identifications (IDs) and passwords for different user groups.

39. The hosting service of claim 31 in which the executable program code further includes iv) a code component for delivery of error and submission process related messages.

40. The hosting service of claim 31 in which the filing submission is implemented using PDF format.

\* \* \* \* \*